(12) United States Patent
Ushigome

(10) Patent No.: US 8,902,504 B2
(45) Date of Patent: Dec. 2, 2014

(54) DIFFRACTIVE OPTICAL ELEMENT HAVING A REFLECTIVE MEMBER DISPOSED BETWEEN DIFFERENT GRATING WALL SURFACES THEREOF, AND OPTICAL SYSTEM AND OPTICAL APPARATUS HAVING THE DIFFRACTIVE OPTICAL ELEMENT

(75) Inventor: Reona Ushigome, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 840 days.

(21) Appl. No.: 13/157,686

(22) Filed: Jun. 10, 2011

(65) Prior Publication Data

US 2011/0304917 A1    Dec. 15, 2011

(30) Foreign Application Priority Data

Jun. 11, 2010    (JP) .................................. 2010-133595

(51) Int. Cl.
    G02B 5/18    (2006.01)
    G02B 27/00   (2006.01)
    G02B 27/44   (2006.01)

(52) U.S. Cl.
    CPC .............. *G02B 27/44* (2013.01); *G02B 5/1895* (2013.01); *G02B 27/0037* (2013.01)
    USPC .......................................... 359/576; 359/569

(58) Field of Classification Search
    USPC .......................................................... 359/576
    See application file for complete search history.

(56) References Cited

U.S. PATENT DOCUMENTS

| | | | | |
|---|---|---|---|---|
| 3,237,508 A | * | 3/1966 | Keller et al. .................. | 359/572 |
| 3,942,873 A | * | 3/1976 | Shimotakahara ............. | 359/572 |
| 4,555,162 A | * | 11/1985 | Aldrich et al. ................ | 65/59.1 |
| 6,529,321 B2 | * | 3/2003 | Pan et al. ...................... | 359/360 |

(Continued)

FOREIGN PATENT DOCUMENTS

| | | |
|---|---|---|
| JP | 2003-240931 A | 8/2003 |
| JP | 2003315526 A | 11/2003 |

(Continued)

OTHER PUBLICATIONS

Ushigome, Reona. "Diffractive Optical Element, Optical System, and Optical Apparatus" Specification and Drawings of unpublished related co-pending U.S. Appl. No. 13/157,751, filed Jun. 10, 2011, pp. 1-72.

(Continued)

*Primary Examiner* — Arnel C Lavarias
(74) *Attorney, Agent, or Firm* — Rossi, Kimms & McDowell LLP

(57) ABSTRACT

A diffractive optical element used as a lens of an optical system includes a first diffractive grating that includes a first grating surface and a first grating wall surface, a reflective member disposed on the first grating wall surface, and a second diffractive grating that includes a second grating surface and a second grating wall surface, and that is disposed so that the second grating surface contacts the first grating surface and the second grating wall surface contacts the reflective member. When off-screen light having an incident angle larger than that of off-axis light flux enters the diffractive optical element at a predetermined incident angle, an emission angle of light having the maximum intensity emitted from the first or second grating wall surface is appropriately set. The maximum width of the reflective member and a grating pitch of each of the first and second diffractive gratings are appropriately set.

9 Claims, 19 Drawing Sheets

(56) References Cited

U.S. PATENT DOCUMENTS

| | | |
|---|---|---|
| 6,641,985 B2 | 11/2003 | Unno et al. |
| 6,650,477 B2 | 11/2003 | Nakai |
| 6,873,463 B2 | 3/2005 | Nakai |
| 7,006,291 B2 | 2/2006 | Hori et al. |
| 7,042,642 B2 | 5/2006 | Tokoyoda et al. |
| 7,599,133 B2 | 10/2009 | Nakai et al. |
| 7,965,444 B2 | 6/2011 | Boettiger |
| 8,064,138 B2 * | 11/2011 | Taira et al. .................... 359/571 |
| 2009/0027776 A1 | 1/2009 | Schall et al. |
| 2010/0189956 A1 | 7/2010 | Etori et al. |

FOREIGN PATENT DOCUMENTS

| | | |
|---|---|---|
| JP | 2004-013081 A | 1/2004 |
| JP | 2004-126394 A | 4/2004 |
| JP | 2005-062717 A | 3/2005 |
| JP | 2005115176 A | 4/2005 |
| JP | 2009-217139 A | 9/2009 |
| WO | WO 2012162880 A1 * | 12/2012 |

OTHER PUBLICATIONS

Ushigome, Reona. "Diffractive Optical Element, Optical System, and Optical Apparatus" Specification and Drawings of unpublished related co-pending U.S. Appl. No. 13/157,628, filed Jun. 10, 2011, pp. 1-79.

Ushigome, Reona. "Diffractive Optical Element, Optical System, and Optical Apparatus" Specification and Drawings of unpublished related co-pending U.S. Appl. No. 13/157,664, filed Jun. 10, 2011, pp. 1-95.

* cited by examiner

DIFFRACTIVE OPTICAL ELEMENT HAVING A REFLECTIVE MEMBER DISPOSED BETWEEN DIFFERENT GRATING WALL SURFACES THEREOF, AND OPTICAL SYSTEM AND OPTICAL APPARATUS HAVING THE DIFFRACTIVE OPTICAL ELEMENT

BACKGROUND OF THE INVENTION

1. Field of the Invention

The present invention relates to a diffractive optical element used as a lens of an optical system.

2. Description of the Related Art

In a diffractive optical element used as a lens of an optical system, it is known that two diffractive gratings are closely disposed and a material and a grating height of each diffractive grating are appropriately set to obtain a high diffraction efficiency in a wide wavelength range. When light enters the diffractive optical element including a grating surface and a grating wall surface, the incident light is reflected or refracted by the grating wall surface to generate unnecessary light (flare). Japanese Patent Laid-Open No. 2003-315526 discloses a diffractive optical element which is provided with a covering layer that covers a grating wall surface by an absorber or a metal material to suppress the generation of a wave having a spherical wave shape to improve a diffraction efficiency of a designed diffractive order. Japanese Patent Laid-Open No. 2005-115176 discloses a diffractive optical element which has a metal material formed on a grating wall surface and light of designed incident light entering the grating wall surface is reflected in a direction of a diffractive angle to improve a diffraction efficiency of the designed diffractive order. Japanese Patent Laid-Open No. 2009-217139 discloses a calculation of a diffraction efficiency using the rigorous coupled wave analysis (RCWA).

In the diffractive optical element used as the lens of the optical system, the unnecessary light which is especially a problem is unnecessary light caused by a total reflection that is generated at an interface of a high refractive index medium and a low refractive index medium by light incident at an oblique incident angle (an off-screen light incident angle) that is different from that of the designed incident angle. However, Japanese Patent Laid-Open No. 2003-315526 and Japanese Patent Laid-Open No. 2005-115176 do not disclose the problem that the unnecessary light is generated by the light incident at the oblique incident angle (the off-screen light incident angle) that is different from that of the designed incident light. Therefore, in the configuration of the diffractive optical element that is disclosed in Japanese Patent Laid-Open No. 2003-315526 and Japanese Patent Laid-Open No. 2005-115176, the unnecessary light cannot be reduced and the deterioration of the image performance cannot be efficiently decreased.

SUMMARY OF THE INVENTION

The present invention provides a diffractive optical element that reduces the deterioration of an image performance.

A diffractive optical element as one aspect of the present invention is configured to be used as a lens of an optical system. The diffractive optical element includes a first diffractive grating that includes a first grating surface and a first grating wall surface, a reflective member disposed on the first grating wall surface, and a second diffractive grating that includes a second grating surface and a second grating wall surface, and that is disposed so that the second grating surface contacts the first grating surface and so that the second grating wall surface contacts the reflective member. When off-screen light having an incident angle larger than an incident angle of off-axis light flux of the optical system enters the diffractive optical element at a predetermined incident angle with reference to a surface normal of the lens, an emission angle of light having the maximum intensity emitted from one of the first grating wall surface and the second grating wall surface is appropriately set. The maximum width of the reflective member and a grating pitch of each of the first diffractive grating and the second diffractive grating are appropriately set.

An optical system as another aspect of the present invention includes the diffractive optical element and a stop disposed at a rear side of the diffractive optical element.

An optical apparatus as another aspect of the present invention includes the optical system.

Further features and aspects of the present invention will become apparent from the following description of exemplary embodiments with reference to the attached drawings.

DESCRIPTION OF THE PREFERRED EMBODIMENTS

Figure 1:
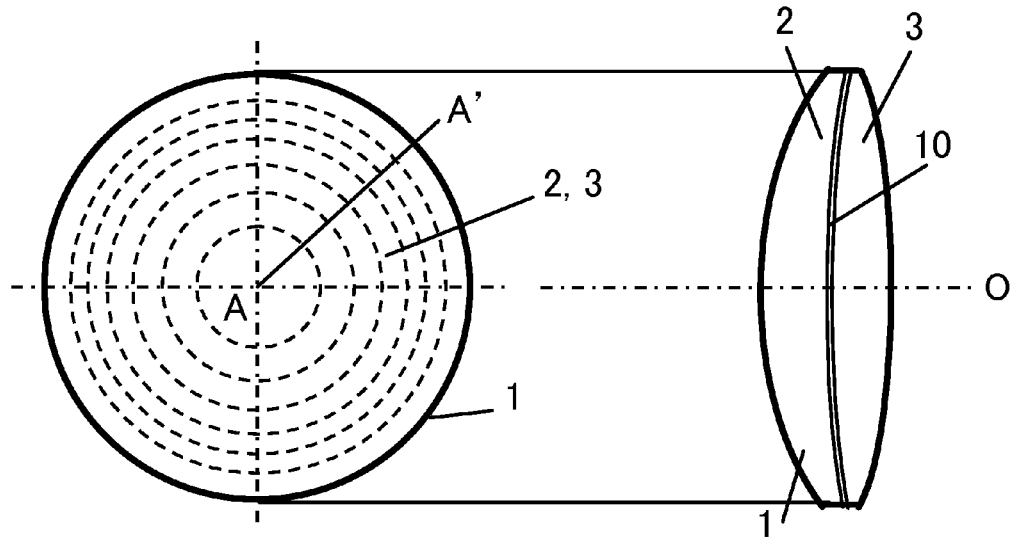
FIG. 1 is a schematic diagram of a main part of a diffractive optical element in the present embodiment.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, a diffractive optical element in Embodiment 1 of the present invention will be described. The diffractive optical element of the present embodiment is suitably used as a lens of an optical system. FIG. 1 is a schematic diagram (a front view and a side view) of the diffractive optical element. A diffractive optical element 1 is configured by including a diffractive grating 10 disposed between substrates 2 and 3 configured by a plane plate or a lens. In the present embodiment, surfaces of the substrates 2 and 3 on which the diffractive grating 10 is provided have curved surfaces. The diffractive grating 10 has a concentric diffractive grating shape around an optical axis O, which has a lens function.

Figure 3:
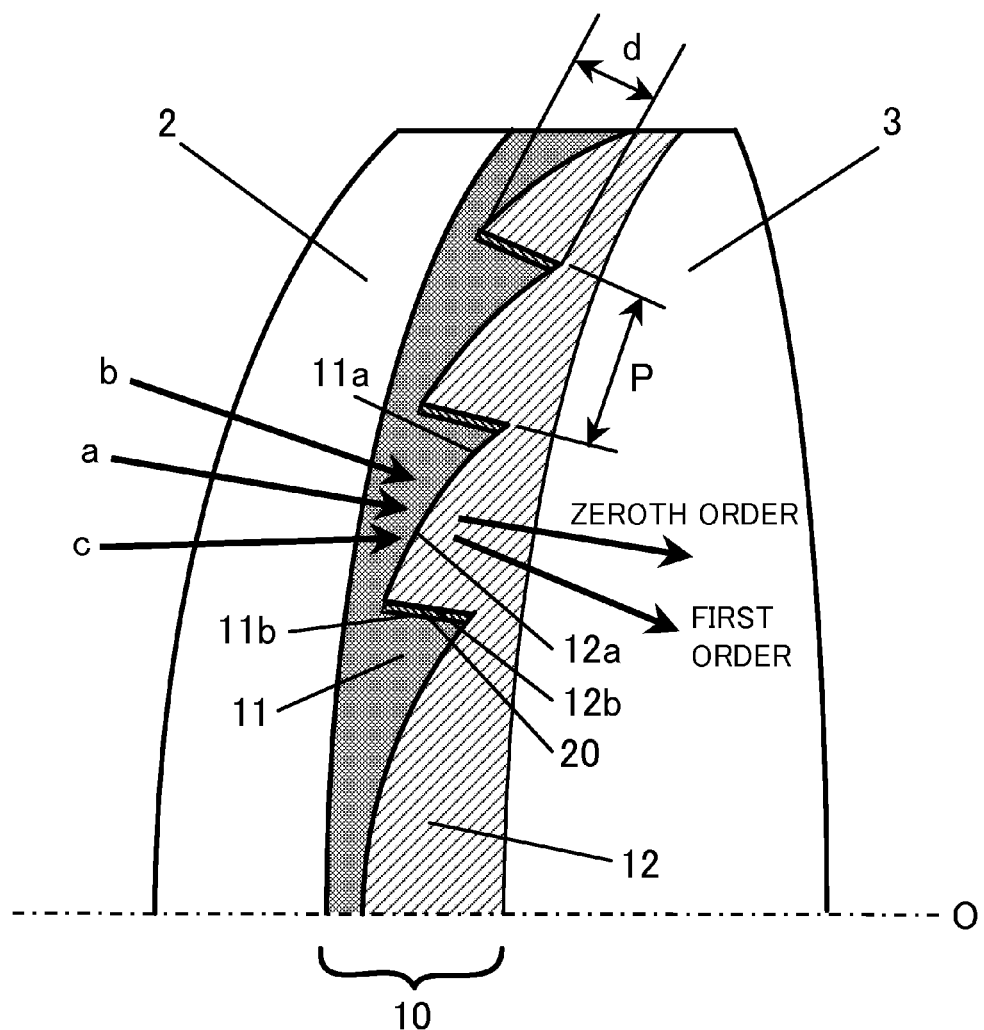
FIG. 3 is an enlarged cross-sectional diagram of the diffractive optical element in the present embodiment.

FIG. 3 is an enlarged cross-sectional diagram of the diffractive optical element 1 which is obtained by cutting and enlarging an A-A' plane of FIG. 1. For easy understanding of a grating shape, FIG. 3 is deformed in a grating depth direction. The number of gratings is depicted so as to be smaller than in reality. The same is applied to cross-sectional diagrams that will be described below. As illustrated in FIG. 3, the diffractive grating 10 of the diffractive optical element 1 is configured by including a first diffractive grating 11, a second diffractive grating 12, and a reflective member 20. The first diffractive grating 11 includes a grating surface 11a (a first grating surface) and a grating wall surface 11b (a first grating wall surface), and has a first refractive index. The second diffractive grating 12 includes a grating surface 12a (a second grating surface) and a grating wall surface 12b (a second grating wall surface). The second diffractive grating 12 has a second refractive index that is different from the first refractive index. The grating surface 11a of the first diffractive grating 11 contacts (closely contacts) the grating surface 12a of the second diffractive grating 12. The reflective member 20 is disposed between the grating wall surfaces 11b and 12b, and has a film-shaped structure. A material and a shape of the reflective member 20 is appropriately designed to control unnecessary light that is generated by oblique incident (off-screen incident) light and to be able to reduce the unnecessary light that has reached an imaging plane. The grating wall surface 11b contacts one of surfaces of the reflective member 20, and the grating wall surface 12b contacts the other surface of the reflective member 20.

As illustrated in FIGS. 1 and 3, the first diffractive grating 11 and the second diffractive grating 12 are diffractive gratings having concentric-shaped blazed structures that are configured by the grating surfaces 11a and 12a and the grating wall surfaces 11b and 12b, respectively. A grating pitch P is gradually changed with the approach from the optical axis O to an outer circumference of the circle to have a lens function (a convergent function and a divergent function). The grating surfaces 11a and 12a and the grating wall surfaces 11b and 12b contact without any gaps via the reflective member 20, and the first diffractive grating 11 and the second diffractive grating 12 totally function as one diffractive grating 10. Since the diffractive grating 10 is configured to have the blazed structure, light (incident light) entering the diffractive optical element 1 is concentrated to be diffracted in a specific diffractive order (+1st order in the present embodiment) direction with respect to 0th order diffractive direction in which the light transmits through the diffractive grating 10 without diffraction.

A use wavelength range of the diffractive optical element 1 of the present embodiment is a visible range. Therefore, materials of the first diffractive grating 11 and the second diffractive grating 12 and their grating heights d are selected so that a diffraction efficiency of the diffracted light having the designed order is improved in a whole of the visible range. In other words, the material and the grating height d of each diffractive grating are determined so that the maximum optical path length difference (the maximum value of the optical path length difference of a peak and a valley of the diffractive portion) of the light passing the plurality of diffractive gratings (the first diffractive grating 11 and the second diffractive grating 12) is near an integral multiple of the wavelength in the use wavelength range. The material and the shape of the diffractive grating are appropriately designed as described above to obtain a high diffraction efficiency in the whole of the use wavelength range. The grating height d of the diffractive grating is defined as a height from a grating end to a grating groove in a direction perpendicular to a grating periodic direction (in a surface normal direction). It is defined as a distance to an intersection of an extension line of the grating surface and a surface normal when the grating wall surface is shifted from the normal direction of the surface or the grating end is deformed.

Figure 4:
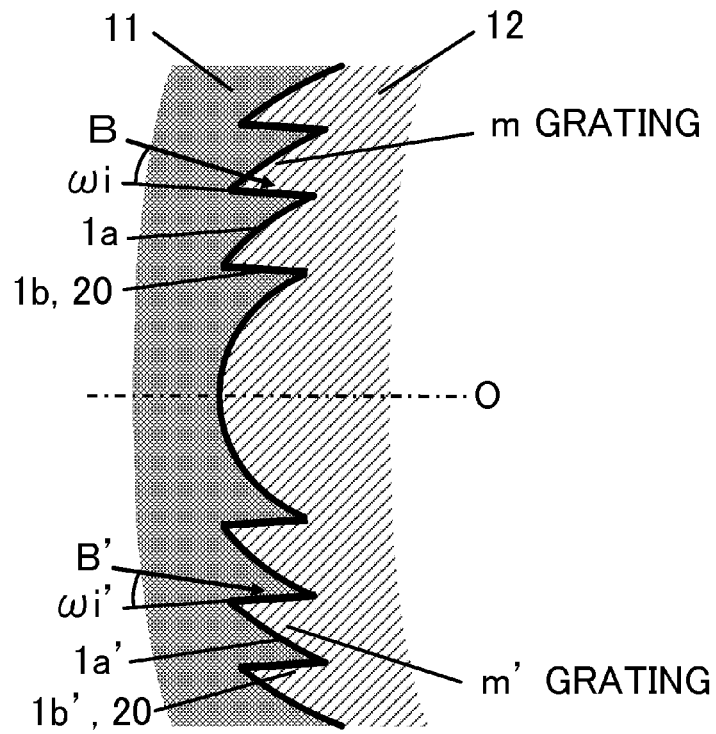
FIG. 4 is a schematic diagram illustrating a relationship between an element structure of the diffractive optical element and off-screen incident light in Embodiment 1.
Figure 5:
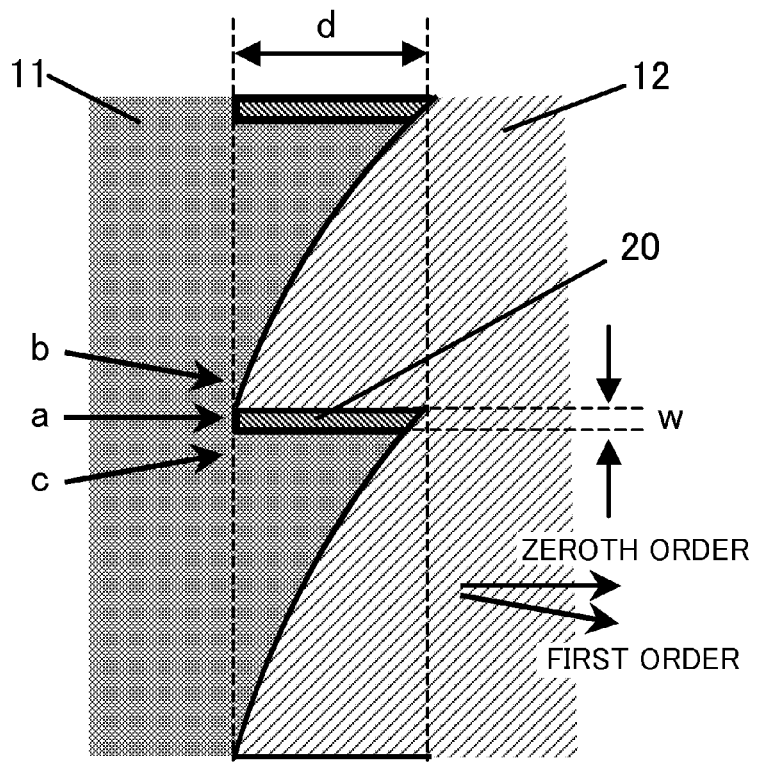
FIG. 5 is an enlarged cross-sectional diagram of a diffraction grating in Embodiment 1.

Subsequently, a configuration of the diffractive optical element and unnecessary light in the present embodiment will be described. FIG. 4 is an enlarged cross-sectional diagram of the diffractive grating 10 that constitutes the diffractive optical element 1. For easy understanding of the grating shape, FIG. 4 is deformed in the grating depth direction, and the number of gratings is depicted so as to be smaller than in reality. The same is applied to cross-sectional diagrams described below. FIG. 5 is a further enlarged cross-sectional diagram of the diffractive grating 10.

As the material that forms the first diffractive grating 11, a resin (nd=1.504, vd=16.3, θgF=0.390, n550=1.511) obtained by mixing a fluorinated acrylic ultraviolet curable resin with ITO nanoparticles is used. As the material that forms the second diffractive grating 12, a resin (nd=1.567, vd=47.0, θgF=0.569, n550=1.570) obtained by mixing an acrylic ultraviolet curable resin with $ZrO_2$ nanoparticles is used. The grating height d is 9.29 μm, and the designed order is +1st order. Symbol "nd" of each of the diffractive gratings 11 and 12 denotes a refractive index for the d-line, symbol "vd" denotes the Abbe's number for the d-line, symbol "θgF" denotes a partial divergent ratio for the F-line, and symbol "n550" denotes a refractive index for the wavelength of 550 nm. The reflective member 20 having substantially a film shape is provided along the grating wall surfaces 1b and 1b'. The reflective member 20 has a film shape of a substantially uniform thickness along the grating wall surface, and controls unnecessary light generated by oblique incident (off-screen incident) light to reduce the unnecessary light reaching an imaging plane. A material that constitutes the reflective member 20 is for example an Al, and a width w of the reflective member 20 is 1.0 μm.

Figure 6A:
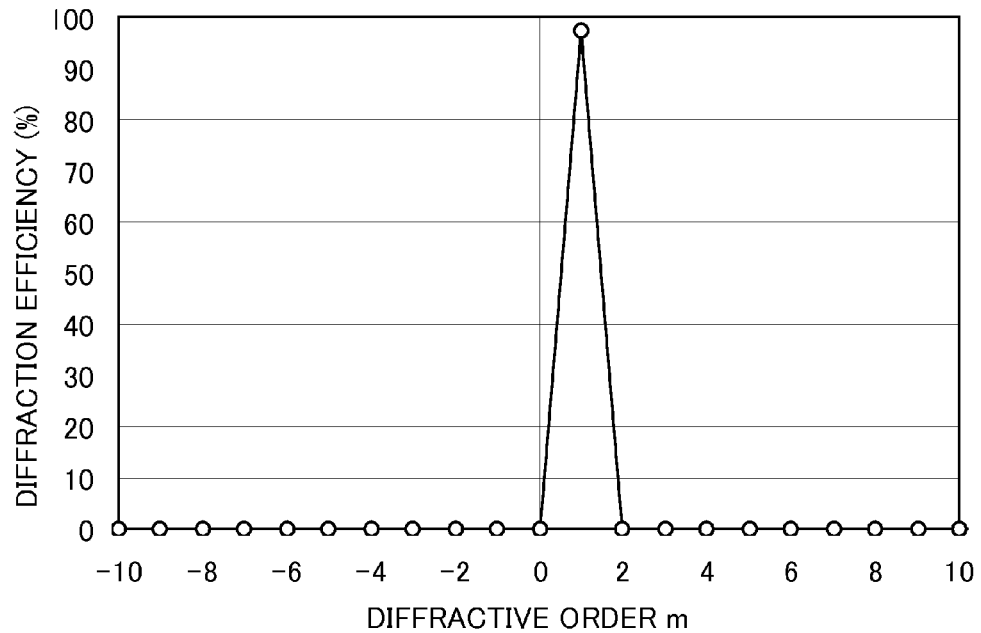
FIGS. 6A and 6B are graphs of diffractive efficiencies for designed incident light of the diffractive optical element in Embodiment 1.
Figure 6B:
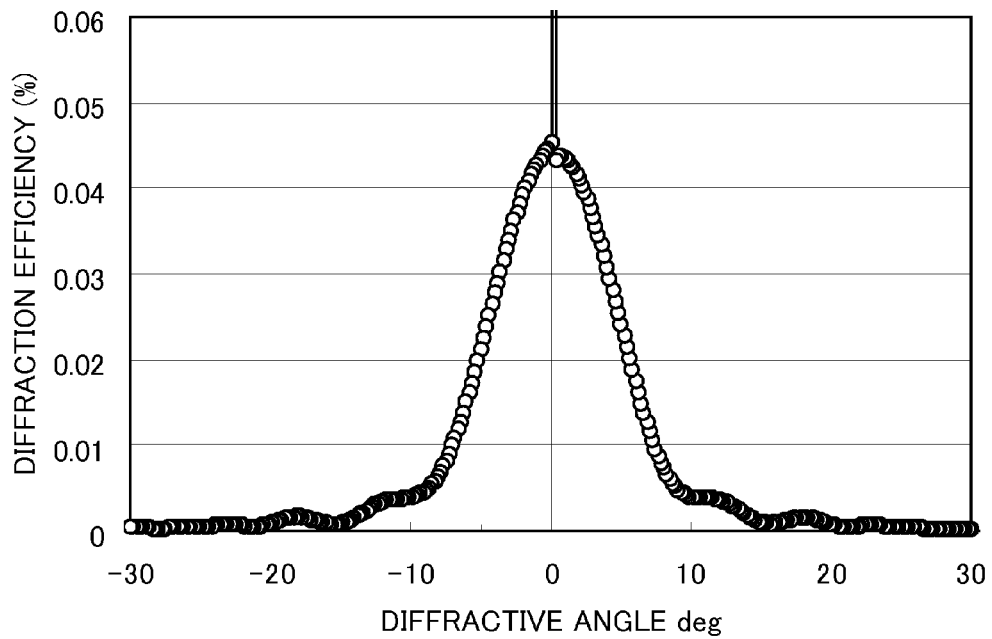
Figure 7:
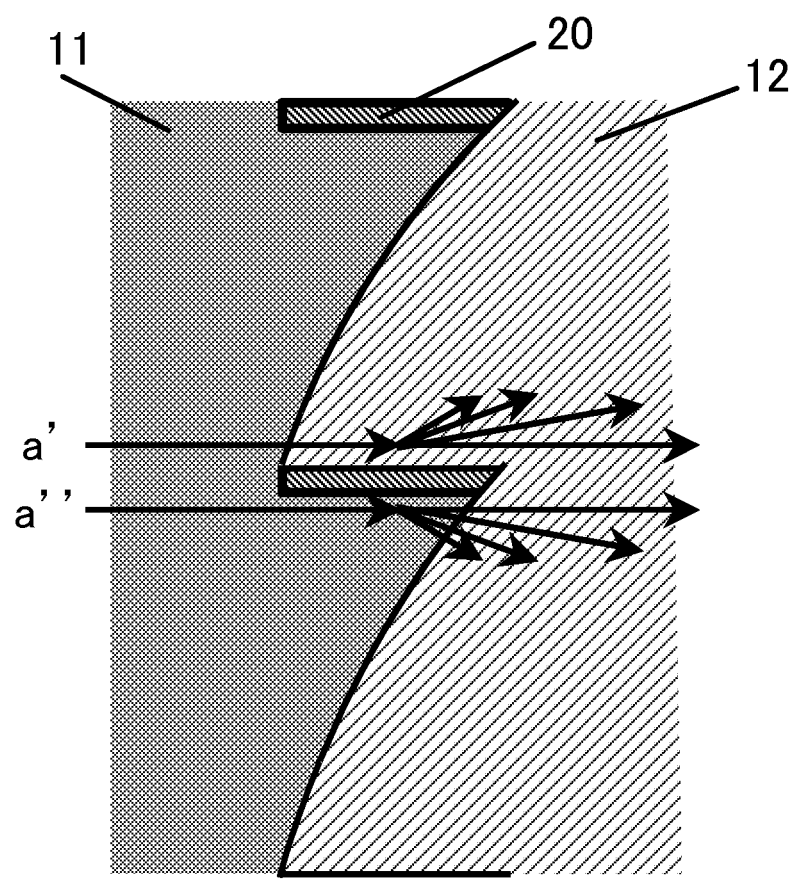
FIG. 7 is a schematic diagram illustrating a propagation of the unnecessary light for the designed incident light of the diffractive optical element in Embodiment 1.

FIGS. 6A and 6B are a result that is obtained by performing the rigorous coupled wave analysis (RCWA) on conditions that an incident angle is 0 degree ("a" in FIG. 5) that is a designed incident angle of the diffractive optical element 1, a grating pitch is 100 μm, and a wavelength is 550 nm. FIG. 6A is a diffraction efficiency near the +1st order diffracted light that is a designed order. A lateral axis indicates a diffractive order, and a vertical axis indicates a diffraction efficiency. FIG. 6B is a result of enlarging a part where the diffraction efficiency indicated by the vertical axis of FIG. 6A is small and of changing the lateral axis from the diffractive order to a diffractive angle to illustrate a high diffractive angle range. A downward direction in FIG. 5 is a positive direction of the diffractive angle. As illustrated in FIG. 6A, the diffraction efficiency of the +1st order diffracted light that is the designed order is 97.46% (the diffractive angle of +0.20 degree). The remaining light is the unnecessary light, and as illustrated in FIG. 6B, the unnecessary light having a peak around 0th order light propagates. With respect to this unnecessary light, as illustrated in FIG. 7, light a' incident at the side of the high refractive index material (at the side of the second diffractive grating 12) for the grating wall surface of a component incident near the grating wall surface of the incident light comes around the side of the high refractive index material on the grating wall surface. Light a" incident at the side of the low refractive index material (at the side of the first diffractive grating 11) comes around the side of the low refractive index material on the grating wall surface as the light a' is inversed. This may occur because the propagation of the electromagnetic field from the side of the low refractive index material to the side of the high refractive index material for the grating wall surface is blocked by the reflective material 20 on the grating wall surface. Part of the light that is originally diffracted as +1st order light by the first diffractive grating 11 and the second diffractive grating 12 is also blocked, and therefore the mismatch of a phase is generated. As a result, the diffraction efficiency of comparative low orders (around ±35 orders and the diffractive angle of ±10 degrees) is increased, and the diffraction efficiency of the +1st order diffracted light that is the designed order is decreased. The grating pitch P assumed in the embodiment is 100 μm as one reference. As illustrated in FIG. 1, as an annular zone is closer to the optical axis, the grating pitch is larger and a harmful influence caused by the grating wall surface and the reflective member 20 is decreased. Therefore, the diffraction efficiency of the designed order is improved and the diffraction efficiency of the unnecessary light is lowered.

Figure 2A:
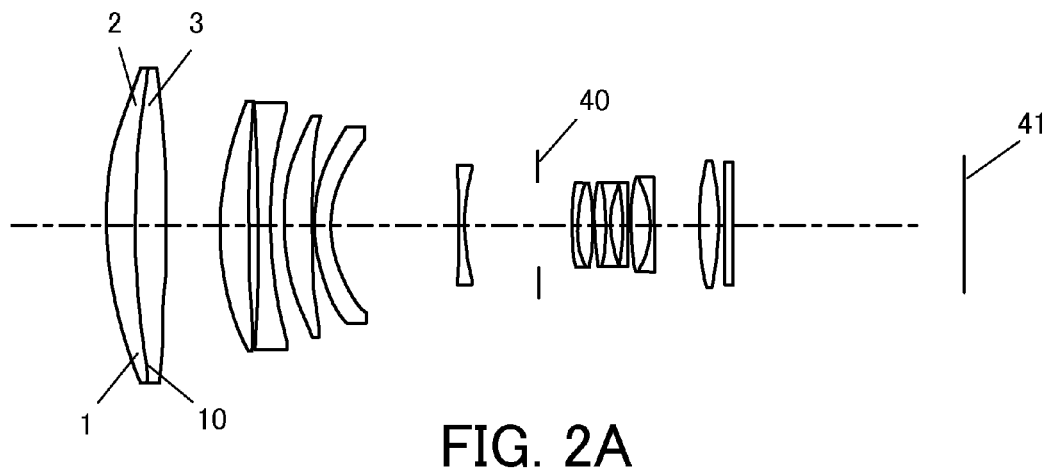
FIG. 2A is a cross-sectional diagram of a main part of an optical system that includes a diffractive optical element of Embodiment 1.
Figure 2B:
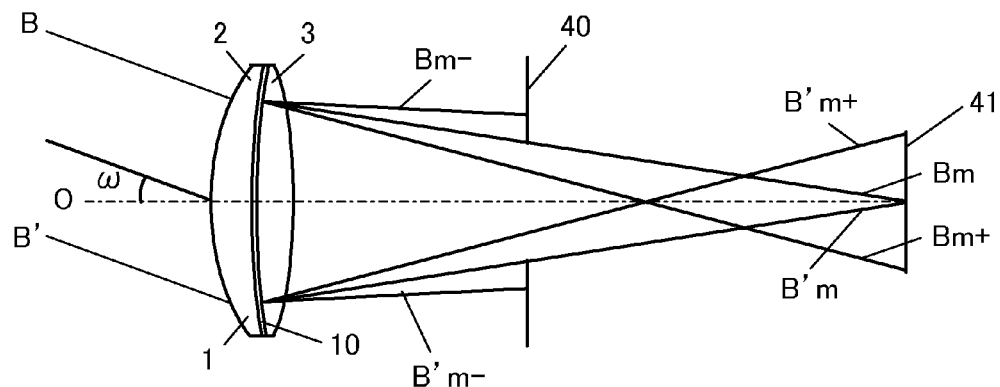
FIG. 2B is a conceptual diagram of unnecessary light in the optical system in Embodiment 1.

Next, the necessary light generated by the entrance of the off-screen light when the diffractive optical element 1 is applied to a real optical system will be described. FIG. 2A is a schematic configuration diagram of a telephoto-type image pickup optical system (an optical system) that includes the diffractive optical element of the present embodiment. This image pickup optical system is provided with a stop 40 and an imaging plane 41 in addition to the diffractive optical element 1, which has a focal length of f=392.00 mm, an F number of Fno=4.12, and a half angle of view of 3.16 degrees, and a diffractive surface is provided on a second surface. FIG. 2B is a schematic diagram of the unnecessary light in the optical system of FIG. 2A.

In FIG. 2B and FIG. 4, off-screen lights B and B' of the incident light at an angle of ω with reference to the optical axis O pass the substrate 2 of the diffractive optical element 1, and then enter an m grating and m' grating that are an m-th diffractive grating counted in an upward direction in the drawing and an m-th diffractive grating counted in an downward direction in the drawing from the optical axis O, respectively. The incident angles of the off-screen lights B and B' for the m grating and the m' grating are angles of ωi and ωi' with reference to a principal ray direction, respectively. In the embodiment, height directions of the grating wall surfaces 1b and 1b' are equivalent to the principal ray direction.

Figure 8A:
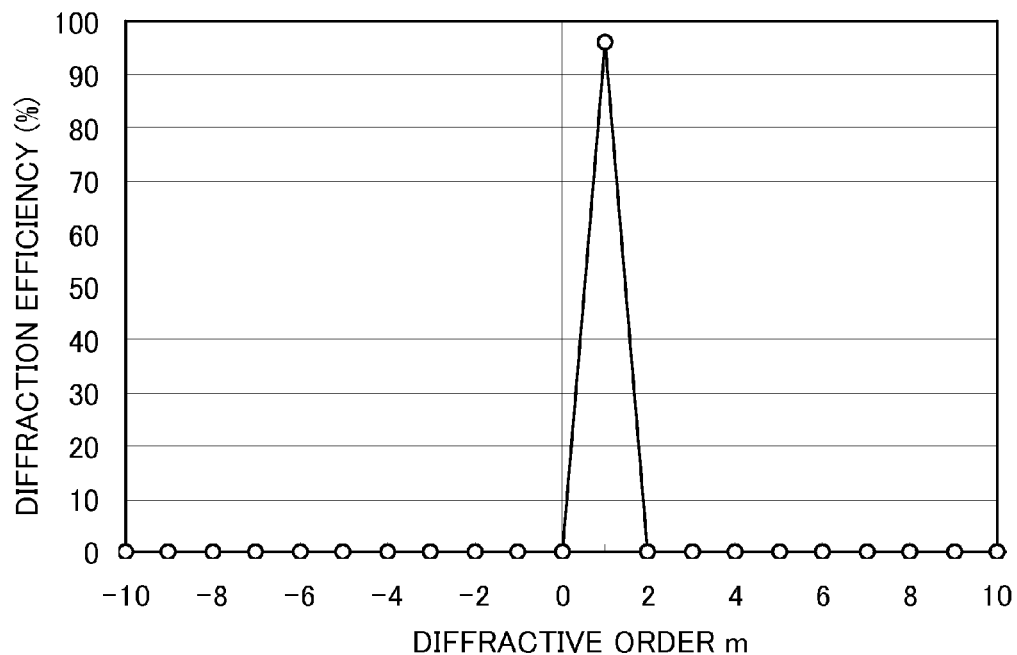
FIGS. 8A and 8B are graphs of diffractive efficiencies for light having an off-screen incident angle of +10 degrees of the diffractive optical element in Embodiment 1.
Figure 8B:
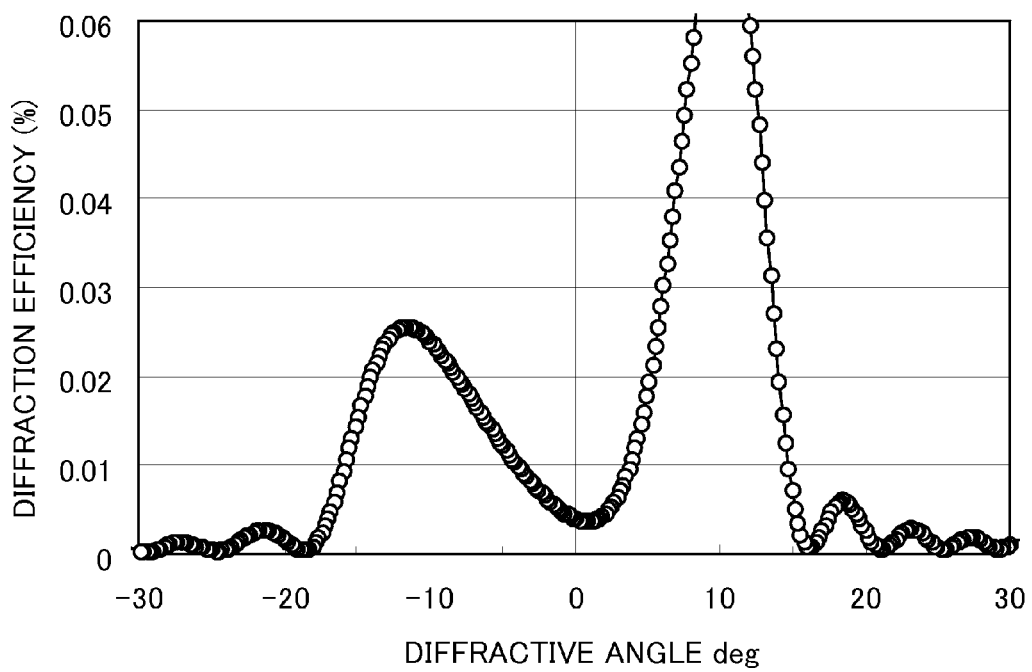

Next, light that enters the diffractive optical element at an oblique incident angle (an off-screen incident angle) of a downward direction with reference to the designed incident angle is assumed ("b" in FIG. 5, and "B" in FIG. 4). FIGS. 8A and 8B are an RCWA calculation result on conditions that the incident angle is +10 degrees, the grating pitch is 100 μm, and the wavelength is 550 nm. The downward direction in FIG. 5 is a positive direction of the incident angle. FIG. 8A is a diffraction efficiency near the +1st order diffracted light that is the designed order. The lateral axis indicates the diffractive order, and the vertical axis indicates the diffraction efficiency. FIG. 8B is a result of enlarging a part where the diffraction efficiency indicated by the vertical axis of FIG. 8A is small and of changing the lateral axis from the diffractive order to a diffractive angle to illustrate a high diffractive angle range. A downward direction in FIG. 5 is a positive direction of the diffractive angle. As illustrated in FIG. 8A, the diffraction efficiency of the +1st order diffracted light that is the designed order is concentrated, but the diffraction efficiency is 96.00% (the diffractive order of +1st order, and the diffractive angle of +9.94 degrees), which is decreased since the angle is inclined from 0 degree that is the designed incident angle. The +1st order diffracted light of this off-screen light having the incident angle does not reach the imaging plane, and therefore the impact is small. The remaining unnecessary light, as illustrated in FIG. 8B, propagates as unnecessary light that has a peak in a specific angle direction. This unnecessary light has a peak in a direction of around −10 degrees, and this propagation direction is substantially equal to −10 degrees that is an emission direction in which a component of the light having the off-screen light incident angle of +10 degrees that enters the grating wall surface is totally reflected to propagate.

As illustrated in FIGS. 2A, 2B, and 4, at least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 7, based on the RCWA calculation result, the diffraction efficiency of the diffractive order of −46 (the diffractive angle of +0.34 degree) is 0.0038%, and the diffraction efficiency of the diffractive order of −47 (the diffractive angle of +0.14 degree) is 0.0039%. Thus, the diffraction efficiency is extremely small.

Figure 9A:
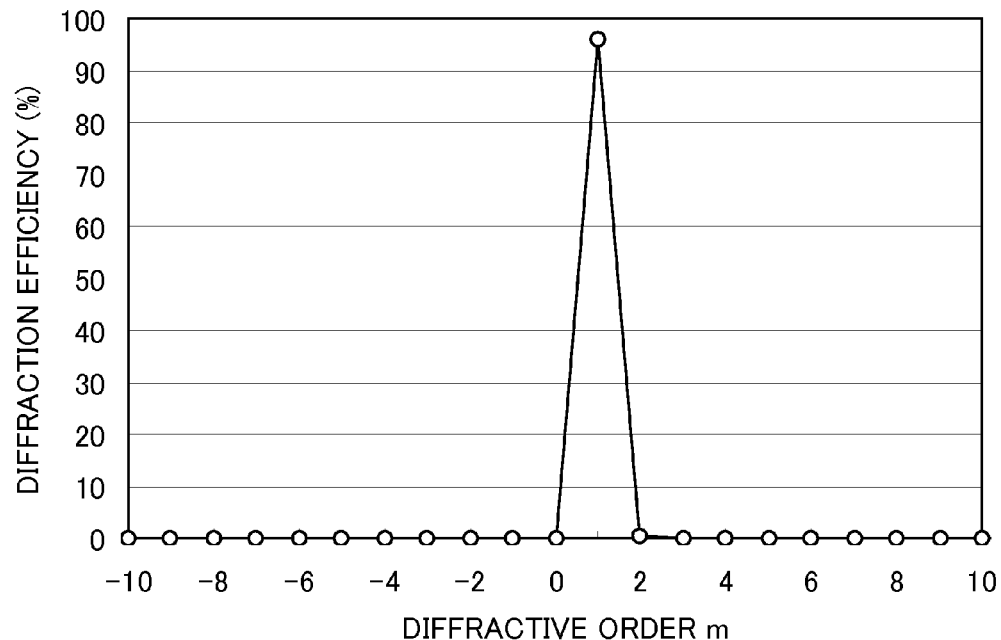
FIGS. 9A and 9B are graphs of diffractive efficiencies for light having an off-screen incident angle of −10 degrees of the diffractive optical element in Embodiment 1.
Figure 9B:
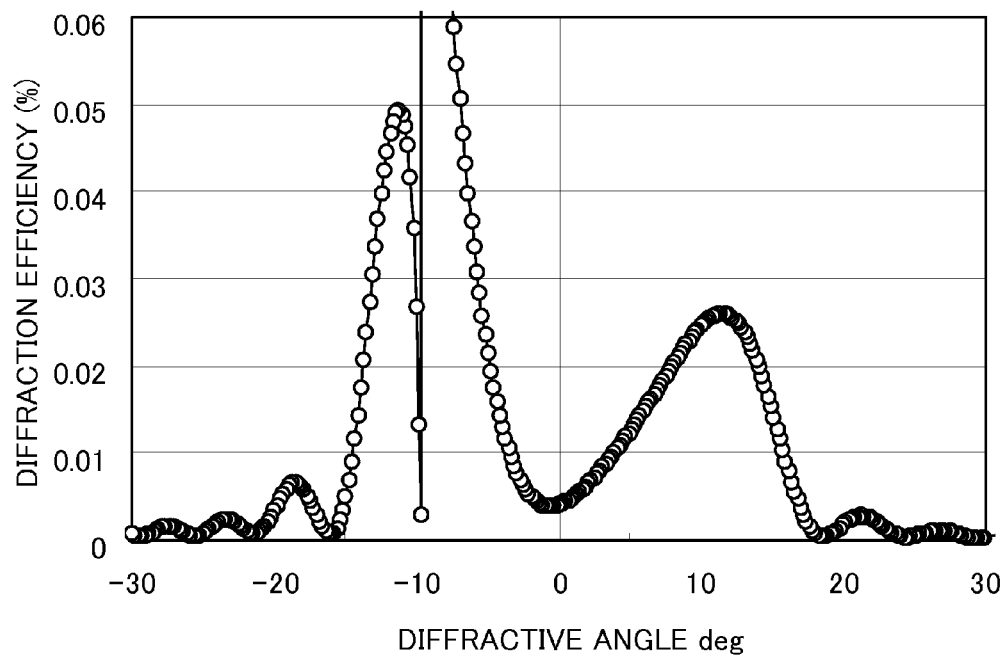

Next, light that enters the diffractive optical element at an oblique incident angle (an off-screen incident angle) of an upward direction with reference to the designed incident angle is assumed ("c" in FIG. 5, and "B'" in FIG. 4). FIGS. 9A and 9B are an RCWA calculation result on conditions that the incident angle is −10 degrees, the grating pitch is 100 μm, and the wavelength is 550 nm. The downward direction in FIG. 5 is a positive direction of the incident angle (the upward direction is the positive direction for the m' grating in FIG. 4). FIG. 9A is a diffraction efficiency near the +1st order diffracted light that is the designed order. The lateral axis indicates the diffractive order, and the vertical axis indicates the diffraction efficiency. FIG. 9B is a result of enlarging a part where the diffraction efficiency indicated by the vertical axis of FIG. 9A is small and of changing the lateral axis from the diffractive order to a diffractive angle to illustrate a high diffractive angle range. As illustrated in FIG. 9A, the diffraction efficiency of the +1st order diffracted light that is the designed order is concentrated, but the diffraction efficiency is 95.80% (the diffractive order of +1st order, and the diffractive angle of −9.42 degrees), which is decreased since the angle is inclined from 0 degree that is the designed incident angle. The +1st order diffracted light of this off-screen light having the incident angle does not reach the imaging plane, and therefore the impact is small. The remaining unnecessary light, as illustrated in FIG. 9B, propagates as unnecessary light that has a peak in a specific angle direction. This unnecessary light has a peak in a direction of around +10 degrees. This propagation direction of the peak in a direction around +10 degrees is substantially equal to +10 degrees that is an emission direction of reflected light obtained from the light having the off-screen light incident angle of −10 degrees that enters the grating wall surface reflected by the reflective member 20.

As illustrated in FIGS. 2A, 2B, and 4, at least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 9, based on the RCWA calculation result, the diffraction efficiency of the diffractive order of +49 (the diffractive angle of +0.26 degree) is 0.0043%, and the diffraction efficiency of the diffractive order of +48 (the diffractive angle of +0.06 degree) is 0.0041%. Thus, the diffraction efficiency is extremely small.

When the off-screen light enters the optical system to which the diffractive optical element 1 of the present embodiment is applied, the unnecessary lights at the m grating and the m' grating extremely become small as illustrated in FIGS. 2A, 2B, and 4. As a result, since the unnecessary light reaching the imaging plane is small, the deterioration of the image performance can be reduced. At the same time, the deterioration of the diffraction efficiency of the designed order can be reduced to the extent that the image performance is not influenced.

In the embodiment, the grating pitch is set to 100 μm. Furthermore, since the contribution of the wall surface is small at the annular zone having a wide grating pitch, the diffraction efficiency of the designed order becomes higher and the diffraction efficiency of the unnecessary light becomes lower. The propagation direction of this unnecessary light does not depend on the grating pitch, and is the same for any of the grating pitches (not shown). Therefore, the diffraction efficiency of the grating pitch of 100 μm is indicated as one reference.

In the embodiment, the incident angle of the off-screen lights B and B' is assumed to be the off-screen +10 degrees (the incident angle ω is +13.16 degrees with reference to the optical axis direction). When the angle is smaller than this incident angle, the unnecessary light of the diffractive optical element is not comparatively noticeable because there are a lot of ghost caused by the reflection on a lens surface or the imaging plane and divergence caused by fine irregularity on surfaces. On the other hand, when the angle is greater than this incident angle, the impact of the unnecessary light of the diffractive optical element is comparatively small because of the reflection on a front-side lens surface or a block of the light by a lens barrel. Therefore, the off-screen incident light of around +10 degrees is most affected for the unnecessary light of the diffractive optical element, and therefore the incident angle of the off-screen light is assumed to be nearly equal to +10 degrees in the embodiment.

In the present embodiment, as illustrated in FIG. 2B, the peak of the unnecessary light is blocked by the stop 40 (Bm– and B'm– in FIG. 2B), but this is one example and the embodiment is not limited to this. Alternatively, the peak of the unnecessary light is introduced to the lens barrel to be blocked or be reflected by a lens at a rear side so as to be an angle at which it does not reach the imaging plane to be able to reduce the unnecessary light. In the present embodiment, an example of a representative grating is described. It is preferable that the RCWA calculation is performed for the diffractive orders and the diffractive efficiencies that reach the imaging plane for a whole of the diffractive grating, and according to this, a closer estimate can be performed. This method is applied to the optical system to be able to closely calculate the unnecessary light that reaches the imaging plane and to design the diffractive optical element which reduces the unnecessary light.

In the present embodiment, the material and the grating height of each diffractive grating are not limited. In the present embodiment, as the material of the diffractive grating, a resin material obtained by dispersing nanoparticles is used, but the embodiment is not limited to this. For example, an organic material such as a resin material, a glass material, an optical crystal material, a ceramics material may also be used. As the nanoparticle material to disperse the nanoparticles, an inorganic nanoparticle material of any of an oxide, a metal, a ceramics, a compound, and a mixture can be used, but the embodiment is not limited to these nanoparticle materials. It is preferable that an average particle diameter of the nanoparticle material is less than or equal to one fourth of the wavelength (the use wavelength or the designed wavelength) of the incident light on the diffractive optical element. If the diameter of the particle is greater than this, the Rayleigh scattering may be larger when mixing the nanoparticle material with the resin material. As the resin material with which the nanoparticle material is mixed, an ultraviolet curable resin that is an organic resin of any of an acrylic system, a fluorine system, a vinyl system, and an epoxy system is suitably used, but the embodiment is not limited to these resin materials. In the present embodiment, the designed order is set to +1st order, but the embodiment is not limited to this. The same effect can also be obtained for a designed order other than +1st order.

The material constituting the reflective material 20 of the present embodiment is a metal material such as Al (or a material containing a metal), but the embodiment is not limited to the metal material if the material has a function of reflecting the off-screen incident light. For example, a material obtained by dispersing carbon-based nanoparticles such as a black carbon, a metal compound such as a metal oxide, a metal sulfide, or a metal carbonate, a material configured by dispersing a pigment, a dye, or the like, into a resin is used. It can also be realized by a structure having the equivalent effect by a fine structure, a carbon nanotube, or the like. Furthermore, the width or the shape of the reflective member 20 can be controlled so as to be changed for every annular zone of the diffractive optical element. As a result, the unnecessary light that reaches the imaging plane can be effectively reduced.

A method of manufacturing the reflective member 20 is not specifically limited. For example, first of all the second diffractive grating 12 is manufactured, and then the reflective member 20 is selectively formed. Specifically, a method of forming the material constituting the reflective member 20 so as to have a thin-film shape using a vacuum evaporation method or the like before pattering using a lithography method, a nanoimprint method, or the like to selectively form the material can be used. A method of selectively forming the material using a mask pattern by an evaporation method or the like, a method of directly forming the material on only the grating wall surface using an ink jet process, or the like can also be used. Then, the first diffractive grating 11 is formed to be able to manufacture the diffractive optical element.

The present embodiment is described on condition that the relationship between the refractive indexes of the first diffractive grating 11 and the second diffractive grating 12 of the diffractive optical element 1 meets n11<n22, but alternatively the embodiment may also be applied to the case in which the relation of n11>n22 is met. When the relationship between the refractive indexes of the first diffractive grating 11 and the second diffractive grating 12 meets n11>n22, the direction of the grating shape of the diffractive grating is configured so as to be opposite since the relation of the refractive indexes is opposite.

Embodiment 2

Next, the diffractive optical element in Embodiment 2 of the present invention will be described. Although the width (the thickness) of the reflective member of the present embodiment is different from that of Embodiment 1, the descriptions related to the same configurations as those of Embodiment 1 is omitted since the other configurations are the same as those of Embodiment 1. The width w (the thickness) of the reflective member 20 of the present embodiment is 0.1 μm.

Figure 10A:
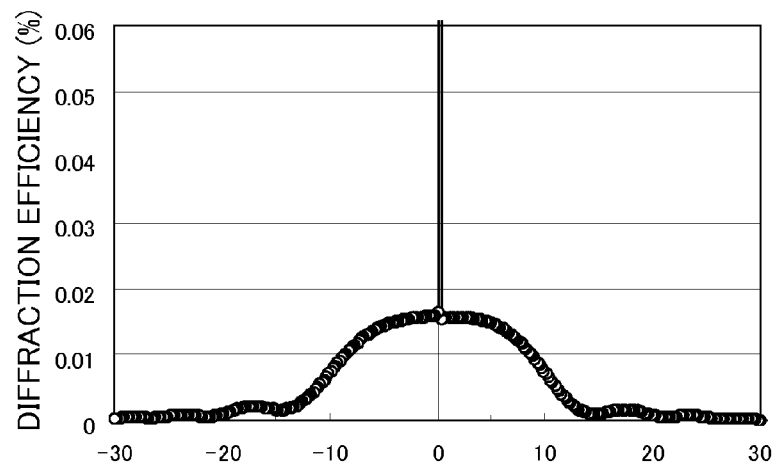
FIGS. 10A to 10C are graphs of diffractive efficiencies for incident light of a diffractive optical element in Embodiment 2.

FIG. 10A is a result that is obtained by performing the RCWA calculation for the diffractive optical element on conditions that an incident angle is 0 degree that is a designed incident angle, a grating pitch is 100 μm, and a wavelength is 550 nm. The diffraction efficiency of the +1st order diffracted light that is the designed order is 98.38%. The remaining light is the unnecessary light which has a peak around 0th order light to propagate similarly to Embodiment 1. The reflective member 20 of the present embodiment has a width (a thickness) thinner than that of Embodiment 1. Therefore, in the present embodiment, a decrease amount of the diffraction efficiency of the +1st order diffracted light is reduced, compared with Embodiment 1.

Figure 10B:
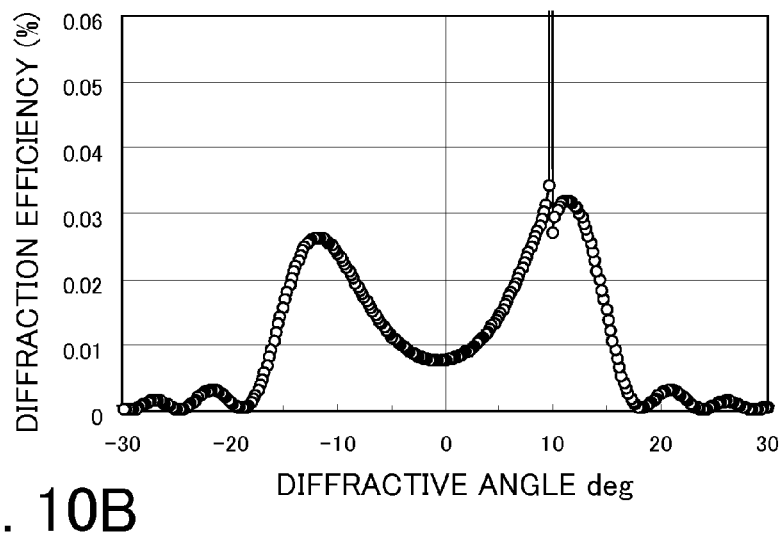

Next, considering light that enters the diffractive optical element at an oblique incident angle (an off-screen incident angle) of a downward direction with reference to the designed incident angle, FIG. 10B illustrates the RCWA calculation result on conditions that the incident angle is +10 degrees, the grating pitch is 100 μm, and the wavelength is 550 nm. The diffraction efficiency of the +1st order diffracted light that is the designed order is concentrated, and the diffraction efficiency is 96.95%, which is decreased since the angle is inclined from 0 degree that is the designed incident angle. Since the +1st order diffracted light of the off-screen light incident angle does not reach the imaging plane, the impact is small. The remaining unnecessary light, similarly to Embodiment 1, has a peak in a direction of around −10 degrees. This propagation direction is substantially equal to a direction of −10 degrees that is an emission direction in which a component of the light having the off-screen light incident angle of +10 degrees that enters the grating wall surface is totally reflected to propagate.

As illustrated in FIGS. 2A, 2B, and 4, for the unnecessary light obtained by the entrance of the off-screen light when the diffractive optical element is applied to the optical system, at least the diffracted light of the unnecessary light by an off-screen light which is substantially equivalent to the diffractive angle of +0.20 degree at which the designed diffractive order for the designed incident angle propagates reaches the imaging plane. Thus, as to the diffraction efficiency at the diffractive angle of around +0.20 degree in FIG. 10A, based on the RCWA calculation result, the diffraction efficiency of the diffractive order of −46 is 0.0078%, and the diffraction efficiency of the diffractive order of −47 is 0.0078%. Thus, the diffraction efficiency is extremely reduced.

Figure 10C:
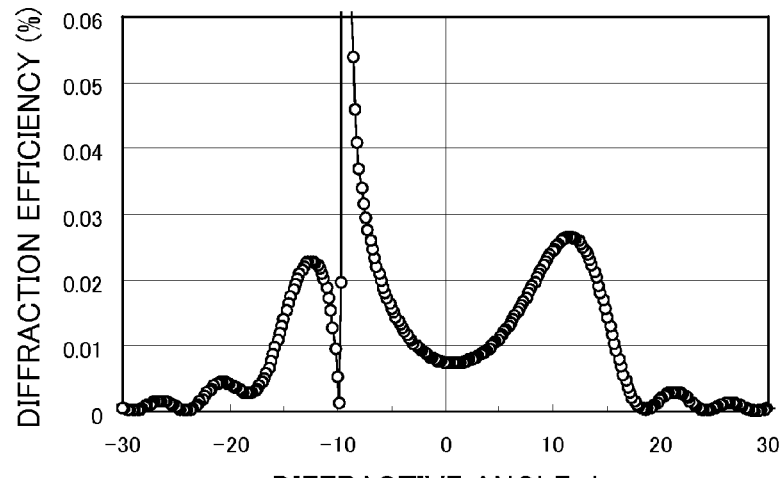

Next, considering light that enters the diffractive optical element at an oblique incident angle (an off-screen incident angle) of an upward direction with reference to the designed incident angle, FIG. 10C illustrates the RCWA calculation result on conditions that the incident angle is −10 degrees, the grating pitch is 100 μm, and the wavelength is 550 nm. The diffraction efficiency of the +1st order diffracted light that is the designed order is concentrated, and the diffraction efficiency is 96.74%, which is decreased since the angle is inclined from 0 degree that is the designed incident angle. Since the +1st order diffracted light of the off-screen light incident angle does not reach the imaging plane, the impact is small. The remaining unnecessary light, similarly to Embodiment 1, has a peak in a direction of around +10 degrees as illustrated in FIG. 10C. The propagation direction of the peak in the direction of around +10 degrees is substantially equal to a direction of +10 degrees that is an emission direction of the reflected light obtained by reflecting the light having the off-screen light incident angle of −10 degrees that enters the grating wall surface.

As illustrated in FIGS. 2A, 2B, and 4, for the unnecessary light obtained by the entrance of the off-screen light when the diffractive optical element is applied to the optical system, at least the diffracted light of the unnecessary light by the off-screen light which is substantially equivalent to the diffractive angle of +0.20 degree at which the designed diffractive order for the designed incident angle propagates reaches the imaging plane. As to the diffraction efficiency at the diffractive angle of around +0.20 degree in FIG. 9, based on the RCWA calculation result, the diffraction efficiency of the diffractive order of +49 is 0.0074%, and the diffraction efficiency of the diffractive order of +48 is 0.0075%. Thus, the diffraction efficiency is extremely small.

When the off-screen light enters the optical system to which the diffractive optical element of the present embodiment is applied, the deterioration of the image performance can be reduced since the reflective member is provided to be able to reduce the unnecessary light that reaches the imaging plane. The diffraction efficiency of the designed order can be reduced to the extent that there is no effect on the image performance. Because the film thickness dependency of the reflective member is small and the structural sensitivity of the reflective member is also small, there are a lot of options of the material and the manufacturing process of the reflective member.

Embodiment 3

Figure 11:
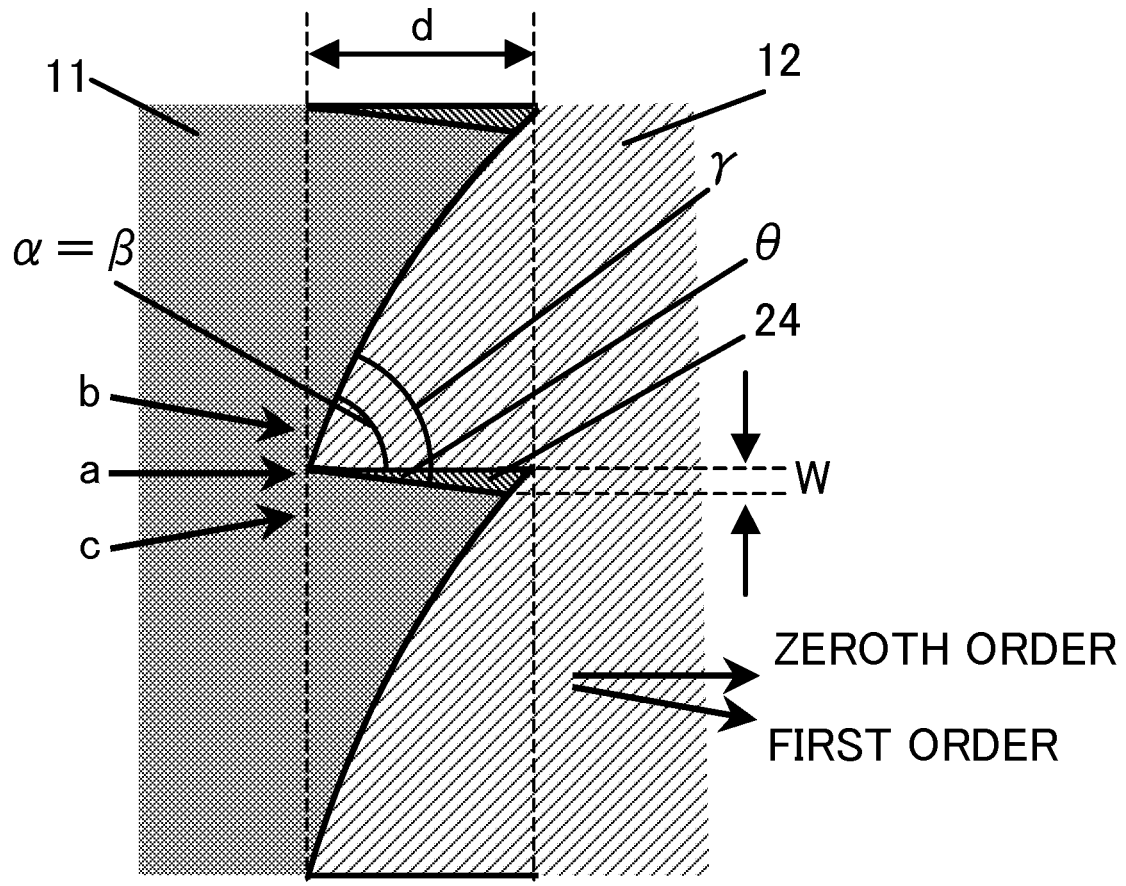
FIG. 11 is an enlarged cross-sectional diagram of a diffraction grating in Embodiment 3.

Next, a diffractive optical element in Embodiment 3 of the present invention will be described. In the present embodiment, the structure of the reflective member is different from that of Embodiments 1 and 2. The reflective member of the present embodiment does not have a thin film shape having a substantially uniform thickness along the grating wall surface. FIG. 11 is an enlarged cross-sectional diagram of the diffractive grating in the present embodiment. The material, the grating height d, and the designed order of each diffractive grating are the same as those of Embodiments 1 and 2. The diffractive optical element of the present embodiment is provided with a reflective member 24. The reflective member 24 is formed so that the width (the thickness) becomes wider from the top of the diffractive grating, instead of having a uniform film shape along the grating wall surface. In other words, the reflective member 24 is formed so that the width (the thickness) becomes wider from an incident side (a left side) to an emission side (a right side) in FIG. 11. When an angle between the grating surface (the first grating surface and the second grating surface) of the diffractive optical element and a surface normal is $\alpha$, an angle between the grating surface and the second grating wall surface is $\beta$, an angle between the grating surface, and the first grating wall surface is $\gamma$, the relation of $\alpha=\beta<\gamma$ is met. The reflective member 24 is configured by Al, and an angle $\theta$ ($\theta=\gamma-\alpha$) of the reflective member 24 is 2 degrees, and the maximum width W of the film shape is 0.32 μm. The angle $\theta$ is an angle of the reflective member 24 with reference to a direction of the surface normal.

Figure 12A:
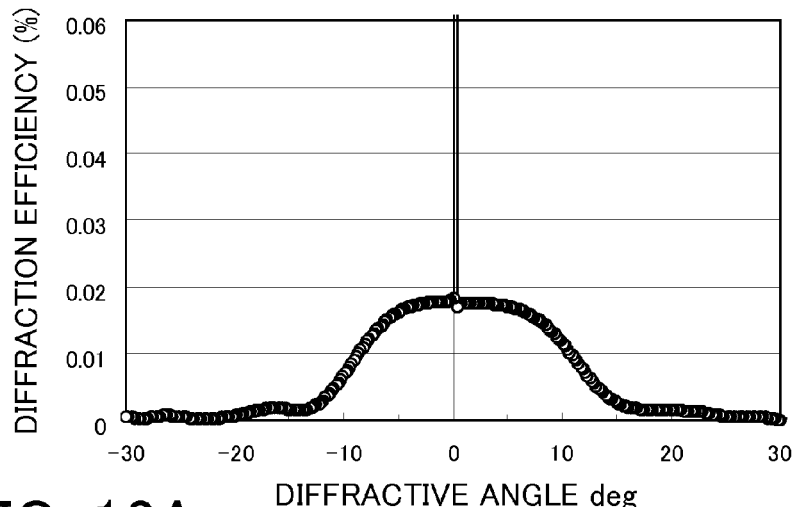
FIGS. 12A to 12C are graphs of diffractive efficiencies for incident light of a diffractive optical element in Embodiment 3.

FIG. 12A is a result that is obtained by performing the RCWA calculation on conditions that an incident angle for the diffractive optical element is 0 degree that is a designed incident angle, a grating pitch is 100 μm, and a wavelength is 550 nm. The diffraction efficiency of the +1st order diffracted light that is the designed order is 98.10% (the diffractive angle of +0.20 degree). The remaining light is the unnecessary light which has a peak around 0th order light to propagate. In the present embodiment, considering the whole area of the diffractive optical element, a decrease amount of the diffraction efficiency of 0.66% of the grating pitch of 100 μm is not substantially influenced and is not a problem since it is rare to directly take an image of a high brightness light source such as the sun in the daytime at the designed incident angle (image-pickup light incident angle).

Figure 12B:
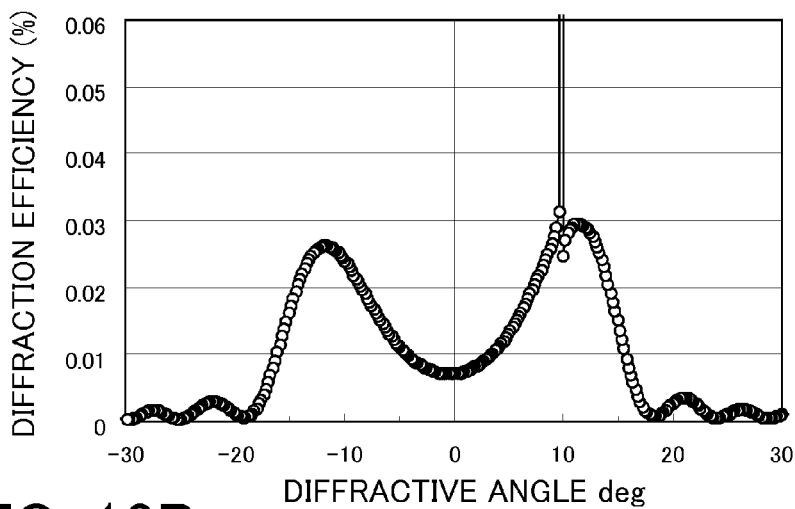

Next, considering light that enters the diffractive optical element at an oblique incident angle (an off-screen incident angle) of a downward direction with reference to the designed incident angle, FIG. 12B illustrates the RCWA calculation result on conditions that the incident angle is +10 degrees, the grating pitch is 100 μm, and the wavelength is 550 nm. The diffraction efficiency of the +1st order diffracted light that is the designed order is concentrated, and the diffraction efficiency is 96.98% (the diffractive order of +1st order, and the diffractive angle of +9.94 degrees), which is decreased since the angle is inclined from 0 degree that is the designed incident angle. Since the +1st order diffracted light of the off-screen light incident angle does not reach the imaging plane, the impact is small. The remaining unnecessary light, similarly to Embodiment 1, has a peak in a direction of around −10 degrees as illustrated in FIG. 12A. The propagation direction is substantially equal to −10 degrees that is an emission direction in which a component of the light having the off-screen light incident angle of +10 degrees that enters the grating wall surface is totally reflected to propagate.

As illustrated in FIGS. 2A, 2B, and 3, when the diffractive optical element is applied to the optical system, at least the diffracted light of the unnecessary light by an off-screen light which is substantially equivalent to the diffractive angle of +0.20 degree at which the designed diffractive order for the designed incident angle propagates reaches the imaging plane. Thus, as to the diffraction efficiency at the diffractive angle of around +0.20 degree in FIG. 12B, based on the RCWA calculation result, the diffraction efficiency of the diffractive order of −46 is 0.0072%, and the diffraction efficiency of the diffractive order of −47 is 0.0071%. Thus, the diffraction efficiency is extremely decreased.

Figure 12C:
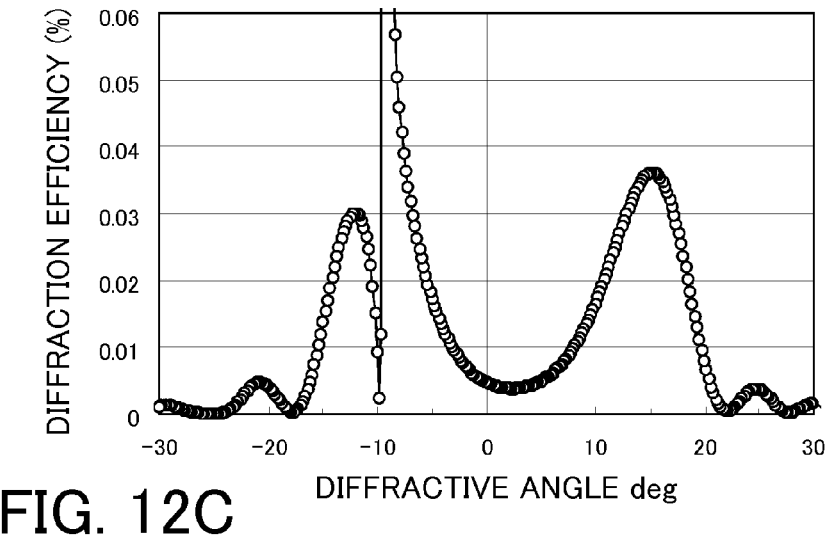

Next, considering light that enters the diffractive optical element at an oblique incident angle (an off-screen incident angle) of an upward direction with reference to the designed incident angle, FIG. 12C illustrates the RCWA calculation result on conditions that the incident angle is −10 degrees, the grating pitch is 100 μm, and the wavelength is 550 nm. The diffraction efficiency of the +1st order diffracted light that is the designed order is concentrated, and the diffraction efficiency is 96.12% (the diffractive order of +1st order, and the diffractive angle of −9.42 degrees), which is decreased since the angle is inclined from 0 degree that is the designed incident angle. Since the +1st order diffracted light of the off-screen light incident angle does not reach the imaging plane, the impact is small. The remaining unnecessary light, as illustrated in FIG. 12C, has a peak in a direction of around +15 degrees. The propagation direction having the peak in the direction of around +15 degrees is substantially equal to a direction of +14 degrees that is an emission direction of the reflected light obtained by reflecting the light having the off-screen light incident angle of −10 degrees that enters the grating wall surface. In the present embodiment, the emitted light is shifted to a direction of the angle higher than the emission direction of Embodiments 1 and 2 where the reflective member having a substantially uniform film shape is provided. This is because the reflective member has a structure whose thickness becomes greater from the apex of the diffractive grating and the angle at which the incident light having the incident angle of −10 degrees is shifted. Thus, the structure of the reflective member is changed to be able to shift the peak of the unnecessary light.

As illustrated in FIGS. 2A, 2B, and 4, at least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 12C, based on the RCWA calculation result, the diffraction efficiency of the diffractive order of +49 is 0.0045%, and the diffraction efficiency of the diffractive order of +48 is 0.0046%. This diffraction efficiency is lower than that of Embodiments 1 and 2. This is because the reflective member is provided with an angle to shift the peak of the unnecessary light to a high emission angle. In the present embodiment, the diffraction efficiency of at least the light which is substantially equal to +0.20 degree that reaches the imaging plane.

As described above, when the off-screen light enters the optical system to which the diffractive optical element including the reflective member is applied, the unnecessary light reaching the imaging plane can be reduced and also the deterioration of the image performance can be reduced. The decrease of the diffraction efficiency of the designed order can also be reduced to the extent that the image performance is not influenced. The reflective member of the present embodiment, considering the manufacturing tolerance, the mass productivity, the cost, and the like, the manufacturing method can be appropriately selected. Furthermore, the angle of the reflective member is controlled to be able to shift the peak of the unnecessary light. Therefore, in accordance with the optical system, the unnecessary light can be controlled so that an amount of the light reaching the imaging plane is reduced.

In the present embodiment, the reflective member 24 is provided so as to be inclined with respect to the grating wall surface of the second diffractive grating 12, but the present embodiment is not limited to this. On the contrary, the reflective member 24 may also be provided so as to be inclined with respect to the grating wall surface of the first diffractive grating 11. The reflective member 24 has a structure where the incident side is thin and the emission side is thick, but on the contrary, it may also have a structure where the incident side is thick and the emission side is thin. Furthermore, it may also have a structure where the thickness of the reflective member 24 is arbitrarily changed in accordance with a position of the grating wall surface.

Embodiment 4

Figure 13:
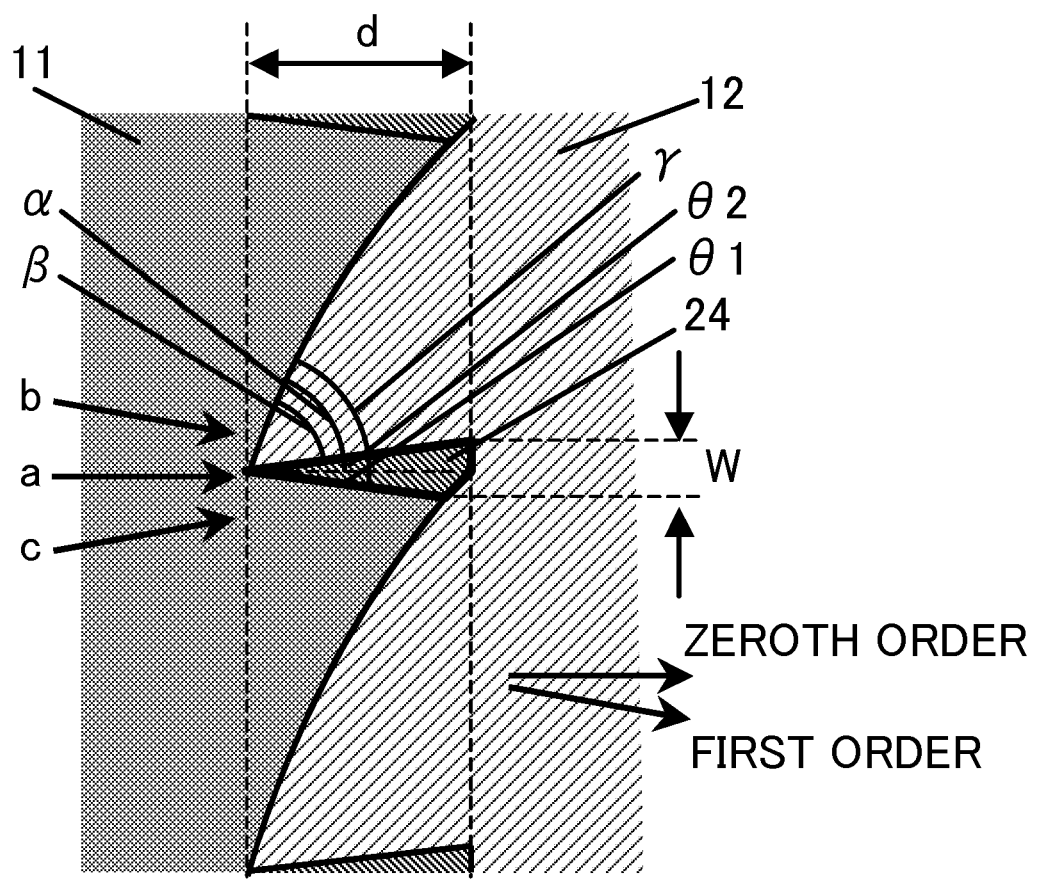
FIG. 13 is an enlarged cross-sectional diagram of a diffraction grating in Embodiment 4.

Next, a diffractive optical element in Embodiment 4 of the present invention will be described. The present embodiment is an alternative embodiment of Embodiment 3, which relates to the reflective member that has the non-uniform thickness along the grating wall surface. FIG. 13 is an enlarged cross-sectional diagram of the diffractive grating of Embodiment 4. The material, the grating height d, and the designed order of each diffractive grating are the same as those of Embodiments 1 to 3. When an angle between the grating surface (the first grating surface and the second grating surface) of the diffractive optical element and a surface normal is $\alpha$, an angle between the grating surface and the second grating wall surface is $\beta$, an angle between the grating surface, and the first grating wall surface is $\gamma$, the relation of $\beta<\alpha<\gamma$ is met. The material of the reflective member 24 is Al, and both angles $\theta 1$ and $\theta 2$ of the reflective member 24 are 2 degrees, and the maximum width W of the reflective member 24 is 0.65 μm. The angle $\theta 1$ ($\theta 1=\gamma-\alpha$) is an angle between a surface normal direction and a contact surface direction of the reflective member 24 and the first diffractive grating 11 (the grating wall surface) in the cross-sectional diagram of FIG. 13. The angle $\theta 2$ ($\theta 2=\alpha-\beta$) is an angle between the surface normal direction and a contact surface direction of the reflective member 24 and the second diffractive grating 12 (the grating wall surface).

Figure 14A:
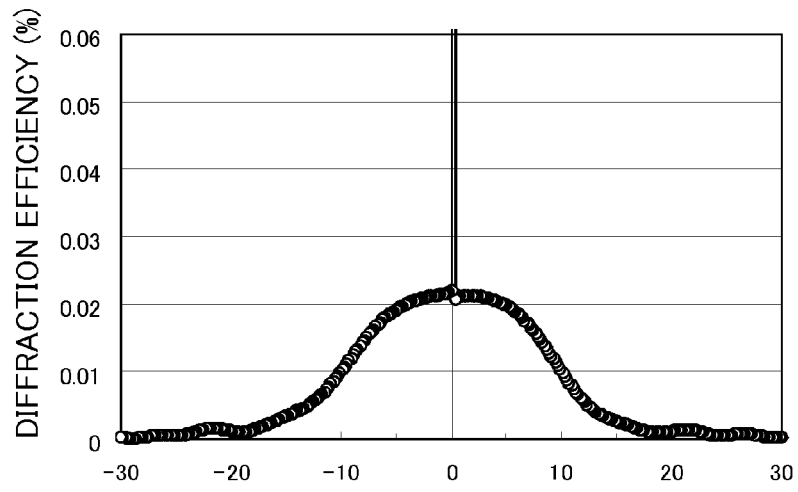
FIGS. 14A to 14C are graphs of diffractive efficiencies for incident light of a diffractive optical element in Embodiment 4.

FIG. 14A is an RCWA calculation result on conditions that the incident angle is 0 degree that is the designed incident angle, the grating pitch is 100 μm, and the wavelength is 550 nm. The diffraction efficiency of the +1st order diffracted light that is the designed order is 97.79% (the diffractive angle of +0.20 degree). The remaining light is the unnecessary light, and as illustrated in FIG. 14A, similarly to Embodiment 1, the unnecessary light having a peak around 0th order light propagates. Part of the light that is originally diffracted as +1st order light by the first diffractive grating 11 and the second diffractive grating 12 is also blocked, and therefore the mismatch of a phase is generated. As a result, the diffraction efficiency of comparative low orders (around ±35 orders and the diffractive angle of ±10 degrees) is increased, and the diffraction efficiency of the +1st order diffracted light that is the designed order is decreased.

Figure 14B:
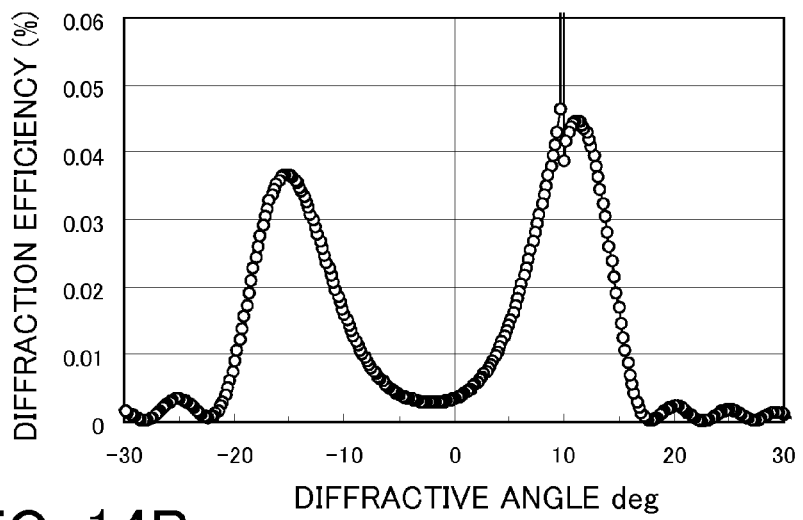

Next, considering light that enters the diffractive optical element at an oblique incident angle (an off-screen incident angle) of a downward direction with reference to the designed incident angle, FIG. 14B illustrates the RCWA calculation result on conditions that the incident angle is +10 degrees, the grating pitch is 100 μm, and the wavelength is 550 nm. The diffraction efficiency of the +1st order diffracted light that is the designed order is concentrated, and the diffraction efficiency is 96.33%, which is decreased since the angle is inclined from 0 degree that is the designed incident angle. Since the +1st order diffracted light of the off-screen light incident angle does not reach the imaging plane, the impact is small. The remaining unnecessary light has a peak in a direction of around +15 degrees. The propagation direction having the peak in the direction of around +15 degrees is substantially equal to a direction of +14 degrees that is an emission direction of the reflected light obtained by reflecting the light having the off-screen light incident angle of −10 degrees that enters the grating wall surface. In the present embodiment, the emitted light is shifted to a direction of the angle higher than the emission direction of Embodiments 1 to 3. This is because the reflective member has a structure whose thickness becomes greater from the apex of the diffractive grating and the angle at which the incident light having the incident angle of −10 degrees is shifted. Thus, the structure of the reflective member is changed to be able to shift the peak of the unnecessary light.

As illustrated in FIGS. 2A, 2B, and 3, at least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 14B, based on the RCWA calculation result, the diffraction efficiency of the diffractive order of −46 is 0.0037%, and the diffraction efficiency of the diffractive order of −47 is 0.0035%. The diffraction efficiency of the present embodiment is lower than those of Embodiments 1 to 3. This is because the reflective member is provided with an angle to shift the peak of the unnecessary light to the high emission angle to decrease at least the light of the diffraction efficiency which is substantially equal to the diffractive angle of +0.20 degree reaching the imaging plane.

Figure 14C:
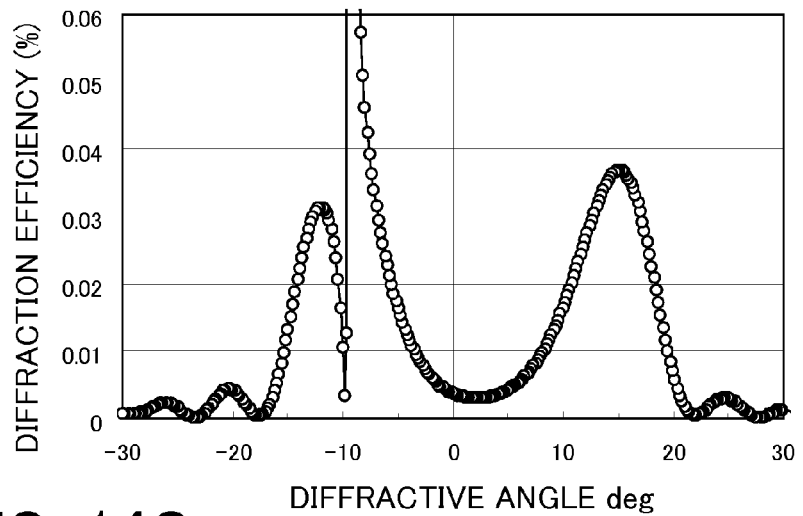

Next, considering light that enters the diffractive optical element at an oblique incident angle (an off-screen incident angle) of an upward direction with reference to the designed incident angle, FIG. 14C illustrates the RCWA calculation result on conditions that the incident angle is −10 degrees, the grating pitch is 100 μm, and the wavelength is 550 nm. The diffraction efficiency of the +1st order diffracted light that is the designed order is concentrated, and the diffraction efficiency is 96.17%, which is decreased since the angle is inclined from 0 degree that is the designed incident angle. Since the +1st order diffracted light of the off-screen light incident angle does not reach the imaging plane, the impact is small. The remaining unnecessary light, as illustrated in FIG. 14C, has a peak in a direction of around +15 degrees. The propagation direction having the peak in the direction of around +15 degrees is substantially equal to a direction of +14 degrees that is an emission direction of the reflected light obtained by reflecting the light having the off-screen light incident angle of −10 degrees that enters the grating wall surface. In the present embodiment, the emitted light is shifted to a direction of the angle higher than the emission direction of Embodiments 1 and 2 where the reflective member having a substantially uniform film shape is provided. This is because the reflective member has a structure whose thickness becomes greater from the apex of the diffractive grating and the angle at which the incident light having the incident angle of −10 degrees is shifted. Thus, the structure of the reflective member is changed to be able to shift the peak of the unnecessary light.

As illustrated in FIGS. 2A, 2B, and 3, at least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 14C, based on the RCWA calculation result, the diffraction efficiency of the diffractive order of +49 is 0.0036%, and the diffraction efficiency of the diffractive order of +48 is 0.0037%. This diffraction efficiency is lower than that of Embodiments 1 and 2. The reflective member is provided with an angle to shift the peak of the unnecessary light to the high emission angle to decrease at least the light of the diffraction efficiency which is substantially equal to the diffractive angle of +0.20 degree reaching the imaging plane.

As described above, according to the diffractive optical element of the present embodiment, the unnecessary light reaching the imaging plane is decreased to be able to reduce the deterioration of the image performance. The decrease of the diffraction efficiency of the designed order can be reduced to the extent that the image performance is not influenced. Furthermore, the peak of the unnecessary light can be shifted by the angles θ1 and θ2 of the reflective member in the present embodiment, and the angles θ1 and θ2 are independently controlled to be able to control the unnecessary light. In Embodiments 1 to 4, specific numerals are indicated only for the unnecessary light that reaches at least the imaging plane. However, since the ranges of the diffractive order and the diffractive angle (the relation of Bm to Bm+ in FIG. 2B) at which the unnecessary light reaches the imaging plane are different in accordance with the optical system behind the diffractive optical element and the position of the stop, the image performance may be deteriorated. Therefore, in accordance with the optical system, the unnecessary light is controlled by the angles θ1 and θ2 to be able to decrease the light reaching the imaging plane. The angle of this reflective member is changed in accordance with specifically a focal length of the optical system, a position of the diffractive optical element in the optical system, and the like, which may be appropriately designed. As the focal length of the optical system is longer and the position of the diffractive optical element is disposed so as to be closer to the object side, the angle can be decreased.

Next, Embodiments 1 to 4 described above will be described referring to Table 1. Table 1 indicates a refractive index nd1, the Abbe's number vd1, a partial dispersion ratio θgF1 and a refractive index n1_550 of the wavelength of 550 nm for the material of the first diffractive grating used as the diffractive optical element of Embodiments 1 to 4 on condition that the d-line passes through the first diffractive grating. Table 1 also indicates a refractive index nd2, the Abbe's number vd2, and a refractive index n2_550 of the wavelength of 550 nm for the material of the second diffractive grating on condition that the d-line passes through the second diffractive grating. A grating height d of the diffractive grating, a material and a shape of the reflective member, a width of the reflective member in Embodiments 3 and 4, and an angle of the reflective member and the maximum width in Embodiments 1 and 2 are indicated.

TABLE 1

|  | EMBODIMENT 1 | EMBODIMENT 2 | EMBODIMENT 3 | EMBODIMENT 4 |
|---|---|---|---|---|
| nd1 | 1.504 | 1.504 | 1.504 | 1.504 |
| vd1 | 16.3 | 16.3 | 16.3 | 16.3 |
| θgF1 | 0.390 | 0.390 | 0.390 | 0.390 |
| nd1_550 | 1.511 | 1.511 | 1.511 | 1.511 |
| nd2 | 1.567 | 1.567 | 1.567 | 1.567 |
| vd2 | 47.0 | 47.0 | 47.0 | 47.0 |
| nd2_550 | 1.570 | 1.570 | 1.570 | 1.570 |
| GRATING THICKNESS d (μm) | 9.29 | 9.29 | 9.29 | 9.29 |
| MATERIAL OF REFLECTIVE MEMBER | Al | Al | Al | Al |
| STRUCTURE OF REFLECTIVE MEMBER | FILM SHAPE | FILM SHAPE | THICKER FROM GRATING APEX | THICKER FROM GRATING APEX |
| WIDTH OF REFLECTIVE MEMBER w(μm) | 1.0 | 0.1 | 0.32 (MAXIMUM WIDTH) | 0.65 ((MAXIMUM WIDTH) |
| ANGLE OF REFLECTIVE MEMBER θ(deg) | — | — | 2.0 | 2.0(θ1) 2.0(θ2) |

As described in Embodiments 1 to 4, a case in which the off-screen incident light that enters the optical system at an angle greater than an incident angle of the off-axis light flux of the optical system enters the diffractive optical element at an incident angle ωi with reference to a surface normal of the lens (the diffractive optical element) is assumed. In this case, it is preferable that an emission angle ωo (an angle with reference to the surface normal of the lens) of the maximum intensity of the light emitted from the grating wall surface (the first grating wall surface 11b and the second grating wall surface 12b) meets the following Expression (1).

$$\omega o \geq \omega i \quad (1)$$

When Expression (1) is met, the unnecessary light is controlled to be able to reduce the unnecessary light reaching the imaging plane.

It is preferable that the following Expression (2) is met, where α is an angle between the grating surface (the first grating surface 11a and the second grating surface 12a) of the diffractive optical element and a surface normal, β is an angle between the grating surface and the second grating wall surface 12b, γ is an angle between the first grating surface 11a and the first grating wall surface 11b.

$$\beta \leq \alpha < \gamma \quad (2)$$

The angles β and γ are set to meet Expression (2) to be able to control the unnecessary light. The angle of this reflective member is appropriately designed in accordance with specifically a focal length of the optical system, a position of the diffractive optical element in the optical system, or the like. Furthermore, it is preferable that the angles β and γ meet the following Expression (3) so as to sufficiently show a function of the reflective member.

$$\gamma - \beta > 0.5° \quad (3)$$

The reflective member is formed in an area of more than or equal to 50% of the grating wall surface to be able to effectively reflect the unnecessary light.

As the width of the reflective member is greater, the mismatch area of the phase is expanded and the diffraction efficiency of the designed order is decreased. Therefore, it is preferable that the maximum width W (μm) of the reflective member and the grating pitch P (μm) of each of the diffractive gratings (the first diffractive grating 11 and the second diffractive grating 12) meet the following Expression (4).

$$0 < W/P < 0.04 \tag{4}$$

When the thickness of the reflective member is increased from the incident side to the emission side as described in Embodiments 3 and 4, i.e. when the reflective member has a non-uniform film thickness, it is preferable that the maximum length of the width of the reflective member meets Expression (4). The diffractive grating is indicated with reference to the grating pitch of 100 μm, and with regard to the diffraction efficiency of the designed order, the relation between the width w of the reflective member and the grating pitch P has a linear relation. The diffraction efficiency of the diffractive grating having the width w of the reflective member and the grating pitch P is almost the same as that of the diffractive grating having the width w×2 and the grating pitch P×2. For example, the diffraction efficiency of the diffractive grating having the grating pitch of 100 μm and the width of 1.0 μm is almost the same as that of the diffractive grating having the grating pitch of 200 μm and the width of 2.0 μm. Therefore, it is preferable that the relation between the grating pitch P and the maximum width W of the reflective member meets Expression (4). In order to obtain the diffractive optical element that does not influence the image performance, it is preferable that the following Expression (5) is met.

$$0 < W/P < 0.02 \tag{5}$$

With regard to the film thickness of the reflective member, since the incident angle on the reflective member is larger than that of a reflective film of an optical apparatus that is commonly used, the film thickness of the common reflective film needs to be more than or equal to 200 nm. On the other hand, since the reflective member of each embodiment can show a sufficient reflective function using the reflective film having the thickness thinner than that of the common reflective film, it is preferable that the following Expression (6) is met.

$$0.02 < W \tag{6}$$

As the material that constitutes the reflective member, in order to reflect the unnecessary light efficiently, it is preferable that an extinction coefficient K in a visible wavelength range is selected from a material that meets the following Expression (7).

$$0.8 < k \tag{7}$$

Figure 15:
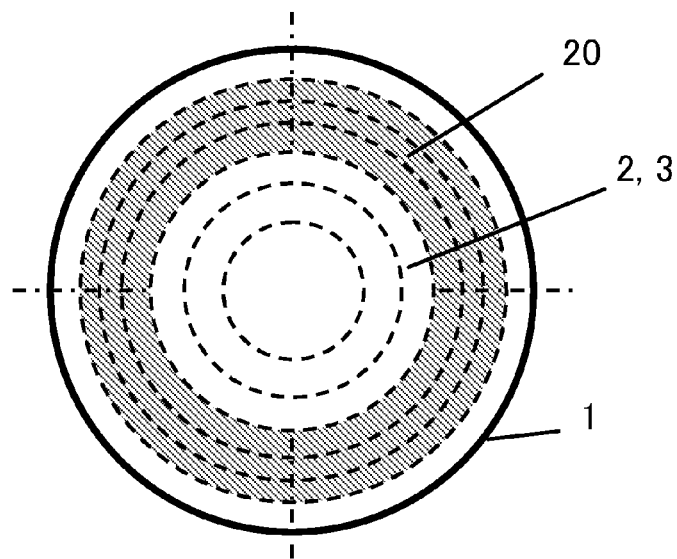
FIG. 15 is a schematic diagram of a main part of the diffractive optical element in the present embodiment.

In Embodiments 1 to 4, the diffractive optical element made of an contacting two-layer DOE is used, but the embodiments are not limited to this, and a diffractive optical element made of a multilayer DOE that further has a laminated diffractive grating may also be used. The reflective member can be changed between a center area and a peripheral area to constitute the optimal diffractive optical element. The reflective member is not necessarily provided in all the annular zones, and it may also be provided at parts of the annular zones. In this case, it is effective that the reflective member is provided at parts containing the minimum grating pitch as illustrated in FIG. 15. This is because the diffractive grating having a small grating pitch has the diffraction efficiency of the unnecessary light and the contribution of the unnecessary light generated in the whole of the diffractive optical element is great. In order to reduce the unnecessary light, a controller of the unnecessary light for setting the designed order to an order other than the 1st order, shifting the angle on the grating wall surface, changing the shape of the grating wall surface to a step shape, or the like, and the reflective member may also be combined to be used.

Comparative Example

Hereinafter, a diffractive optical element as a comparative example with respect to Embodiments 1 to 4 will be described. A material and a grating height of a diffractive grating are the same as those of Embodiments 1 to 4, and the comparative example describes a case where a reflective member is not provided on a grating wall surface.

Figure 17A:
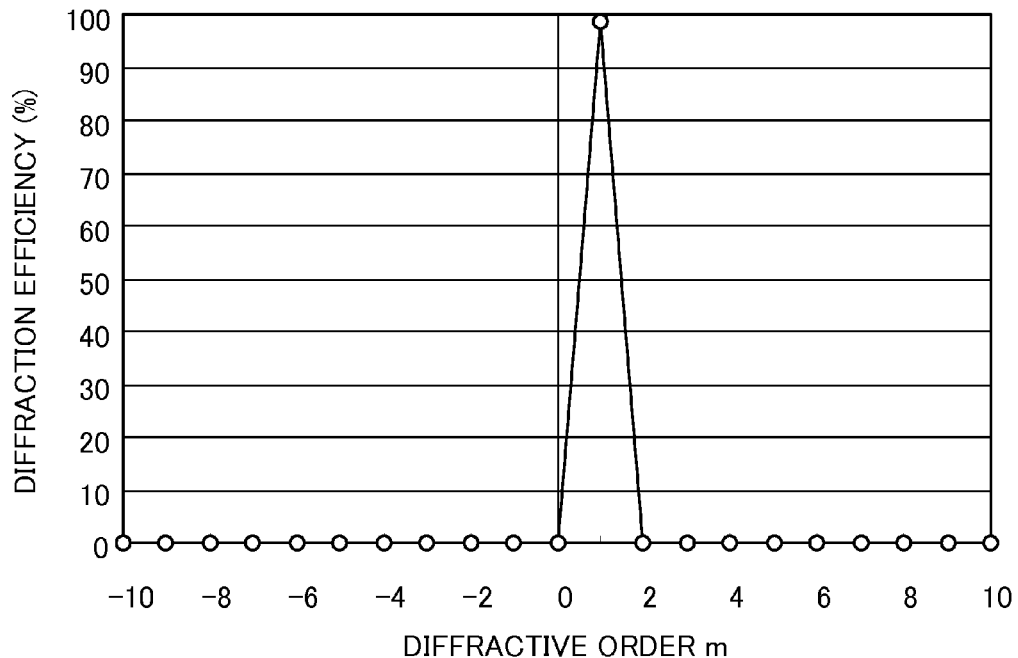
FIGS. 17A and 17B are graphs of diffractive efficiencies for designed incident light of a diffractive optical element in a comparative example.
Figure 17B:
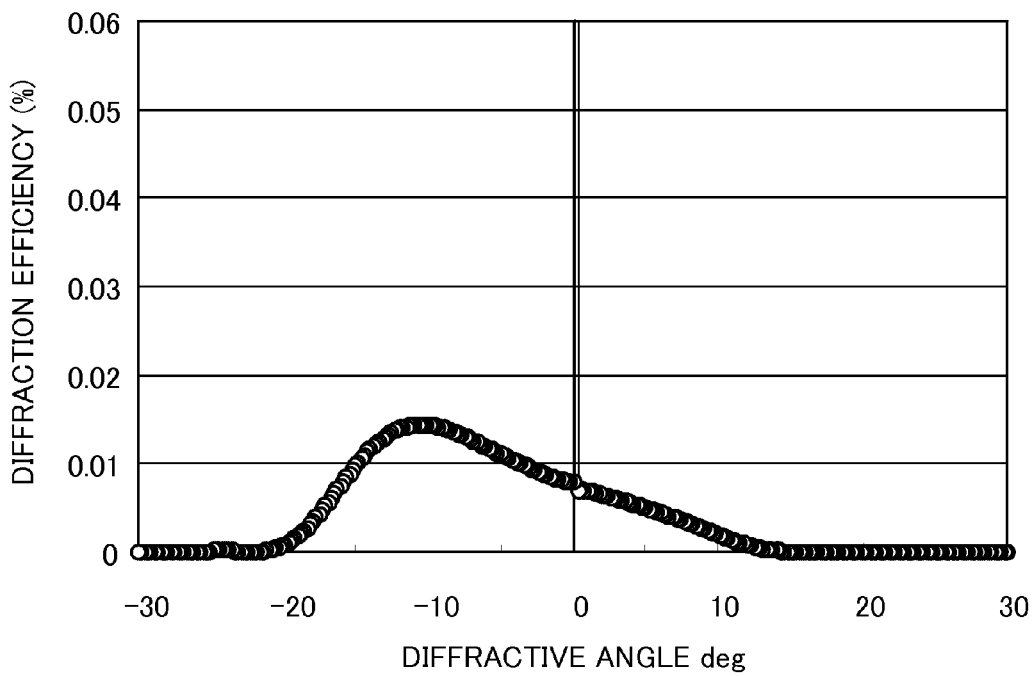
Figure 18:
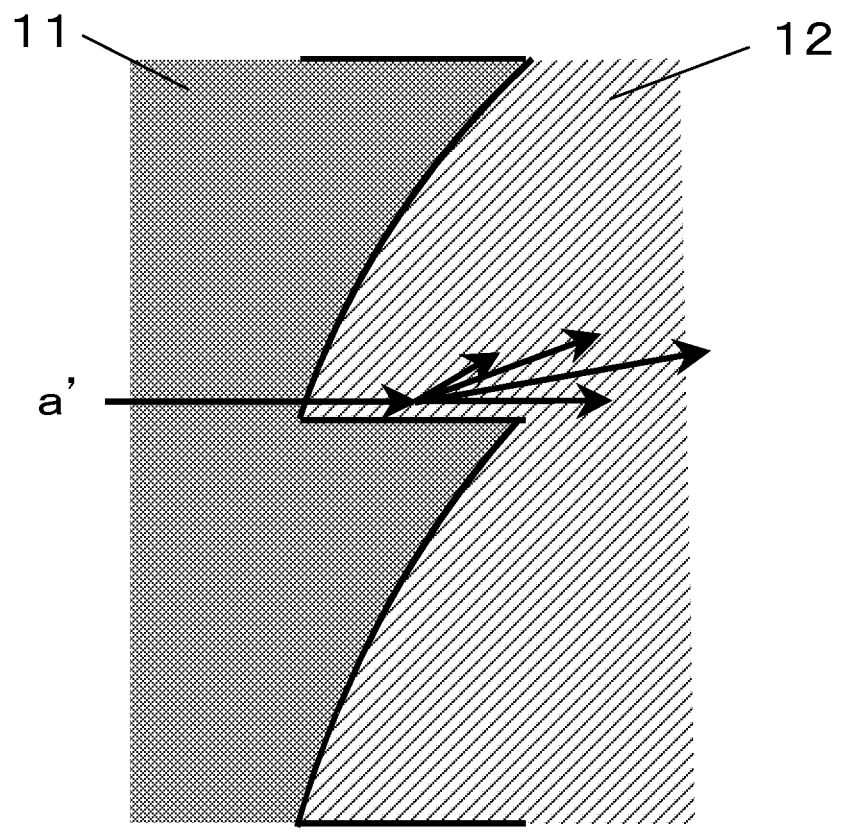
FIG. 18 is a schematic diagram illustrating a propagation of the unnecessary light for the designed incident light of the diffractive optical element in the comparative example.

FIGS. 17A and 17B are an RCWA calculation result on conditions that the incident angle is 0 degree that is the designed incident angle of the diffractive optical element in the present comparative example, the grating pitch is 100 μm, and the wavelength is 550 nm. FIG. 17A is a diffraction efficiency near the +1st order diffracted light that is a designed order. A lateral axis indicates a diffractive order, and a vertical axis indicates diffraction efficiency. FIG. 17B is a result of enlarging a part where the diffraction efficiency indicated by the vertical axis of FIG. 17A is low and of changing the lateral axis from the diffractive order to a diffractive angle to illustrate a high diffractive angle range. As illustrated in FIG. 17A, the diffraction efficiency is concentrated to the +1st order diffracted light that is the designed order, but the diffraction efficiency is 98.76% (the diffractive order of +1st order and the diffractive angle of +0.20 degree), and does not reach 100%. The remaining light is unnecessary light that has a peak in a specific angle direction and that propagates as illustrated in FIG. 17B. This unnecessary light is, as illustrated in FIG. 18, may be generated by a diffraction phenomenon that a component a' of light incident near the grating wall surface comes around the side of the high refractive index material side on the grating wall surface. However, this unnecessary light is not influenced and is not a problem since it is rare to directly take an image of a high brightness light source such as the sun in the daytime at this designed incident angle (image-pickup light incident angle).

Figure 19A:
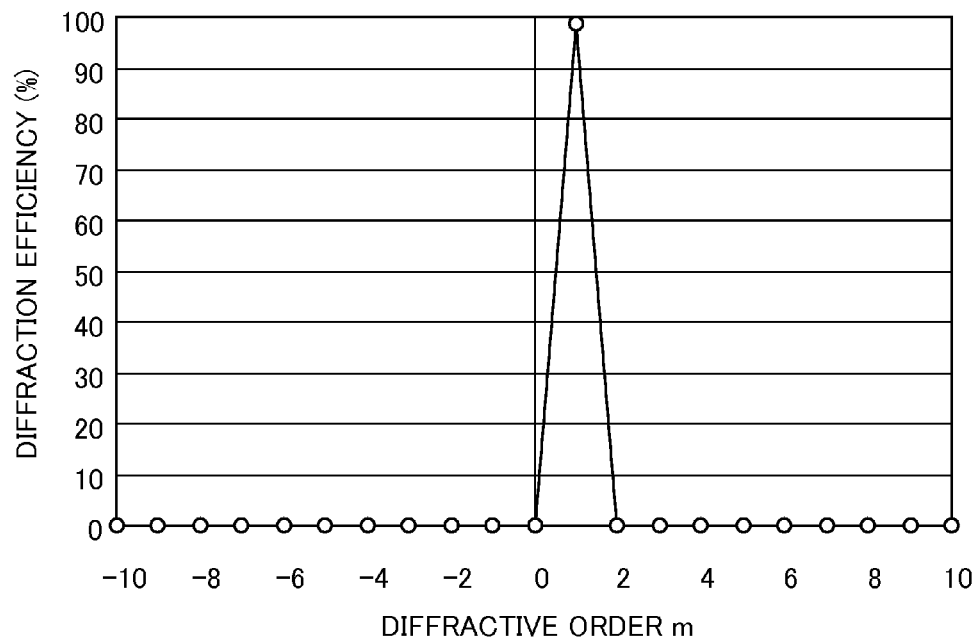
FIGS. 19A and 19B are graphs of diffractive efficiencies for light having an off-screen incident angle of +10 degrees of the diffractive optical element in the comparative example.
Figure 19B:
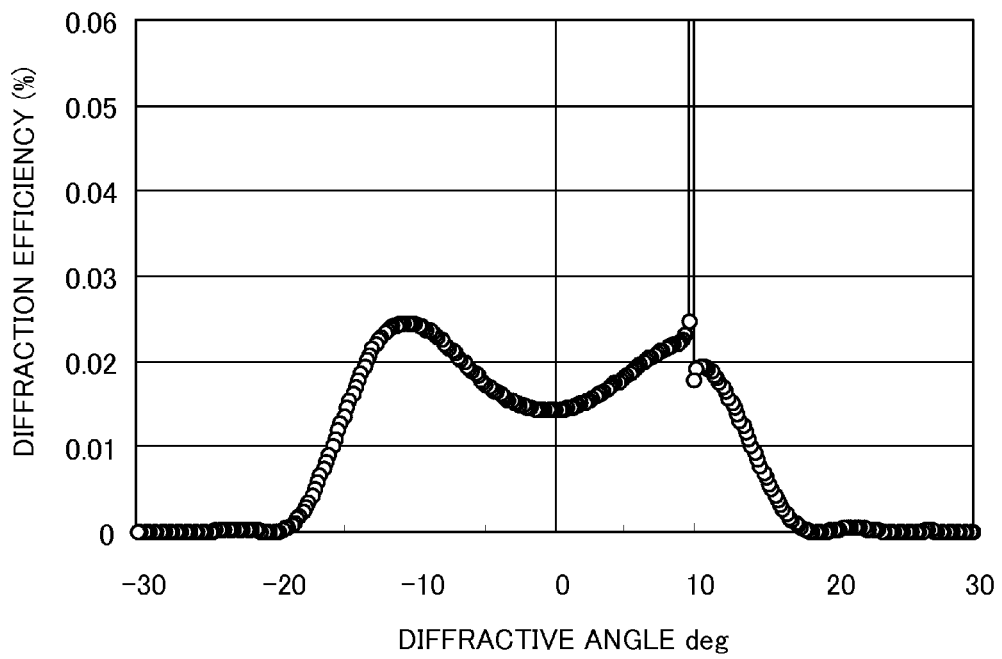
Figure 20:
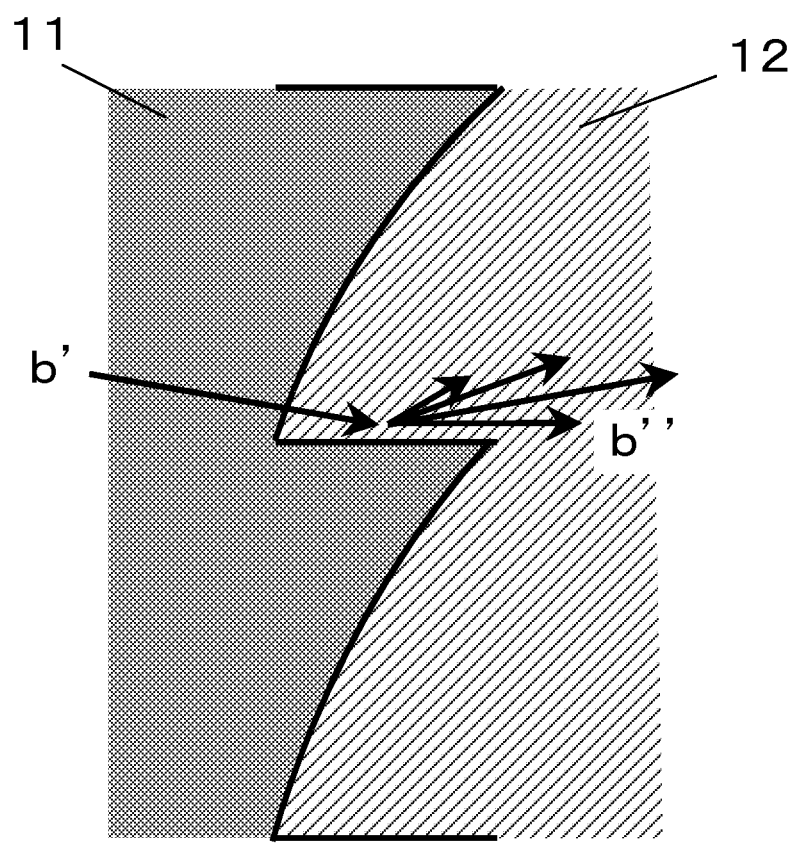
FIG. 20 is a schematic diagram illustrating a propagation of the unnecessary light for the light having the off-screen incident angle of +10 degrees of the diffractive optical element in the comparative example.

Next, considering light that enters the diffractive optical element at an oblique incident angle (an off-screen incident angle) of a downward direction with reference to the designed incident angle, FIGS. 19A and 19B illustrate the RCWA calculation result on conditions that the incident angle is +10 degrees, the grating pitch is 100 μm, and the wavelength is 550 nm. FIG. 19A is a diffraction efficiency near the +1st order diffracted light that is the designed order. The lateral axis indicates the diffractive order, and the vertical axis indicates the diffraction efficiency. FIG. 19B is a result of enlarging a part where the diffraction efficiency indicated by the vertical axis of FIG. 19A is small and of changing the lateral axis from the diffractive order to a diffractive angle to illustrate a high diffractive angle range. As illustrated in FIG. 19A, the diffraction efficiency of the +1st order diffracted light that is the designed order is concentrated, but the diffraction efficiency is 97.15% (the diffractive order of +1st order, and the diffractive angle of +9.94 degrees), which is decreased from 100% since the angle is inclined from 0 degree that is the designed incident angle. The +1st order diffracted light of this off-screen light does not reach the imaging plane, and therefore the impact is small. The remaining unnecessary light, as illustrated in FIG. 19B, propagates as unnecessary light that has a peak in a specific angle direction. This unnecessary light has a peak in a direction of around −10 degrees, and this propagation direction is substantially equal to a direction of −10 degrees that is an emission direction in which a component of the light having the off-screen light incident angle of +10 degrees that enters the grating wall surface is totally reflected to propagate. Since it enters the grating wall surface from the side of the high refractive index material to the side of the low refractive index material at an angle of +80 degrees that is larger than a critical angle of 74.2 degrees, the total reflection occurs. This unnecessary light is expanded from the peak in a direction of around −10 degrees to a large angle range. As illustrated in FIG. 20, this unnecessary light may be generated since a component b' of the incident light entering the vicinity of the grating wall surface is totally reflected on the grating wall surface to propagate in the direction of −10 degrees and further the unnecessary light is expanded around a totally-reflected emission direction to propagate. This unnecessary light is expanded near the diffractive angle of 0 degree ("b'''" in FIG. 20). The diffractive angle of 0 degree ("b'''" in FIG. 20) is substantially equal to the diffractive angle of 0.20 degree of the 1st order diffracted light by the designed incident angle of 0 degree. At least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 19B, based on the RCWA calculation result, the diffraction efficiency of the diffractive order of −46 (the diffractive angle of +0.34 degree) is 0.014%, and the diffraction efficiency of the diffractive order of −47 (the diffractive angle of +0.14 degree) is 0.014%.

Figure 21A:
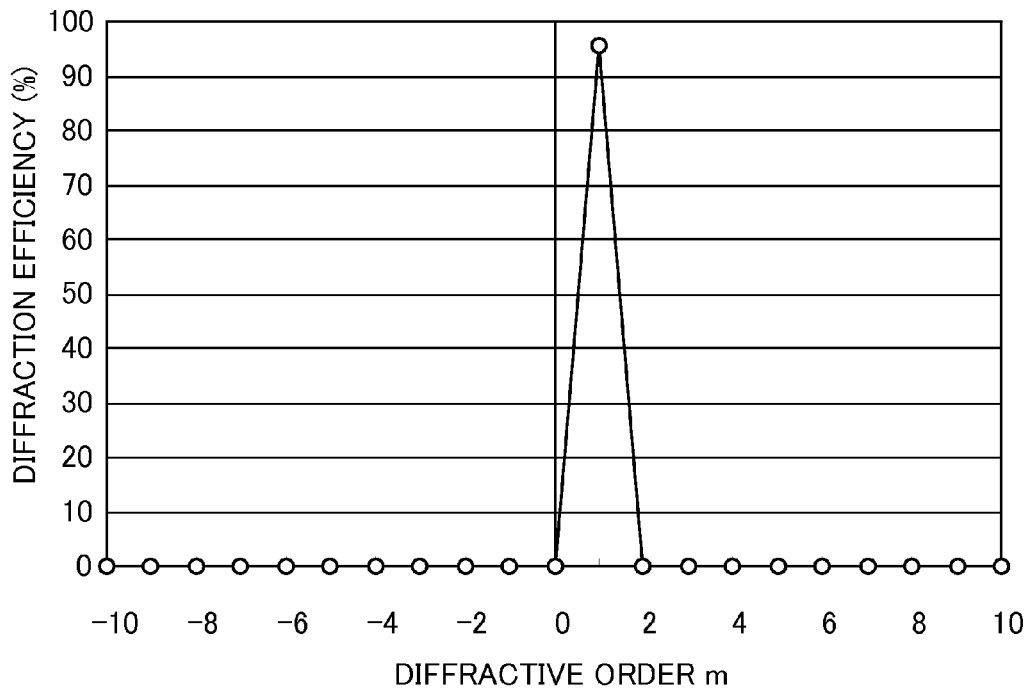
FIGS. 21A and 21B are graphs of diffractive efficiencies for light having an off-screen incident angle of −10 degrees of the diffractive optical element in the comparative example.
Figure 21B:
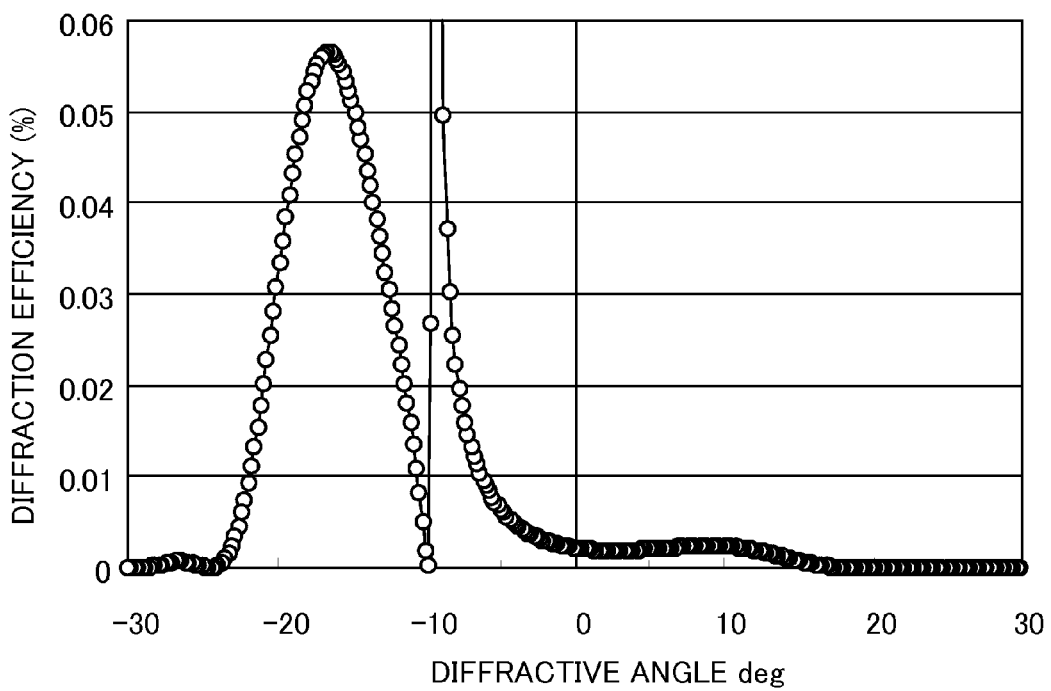
Figure 22:
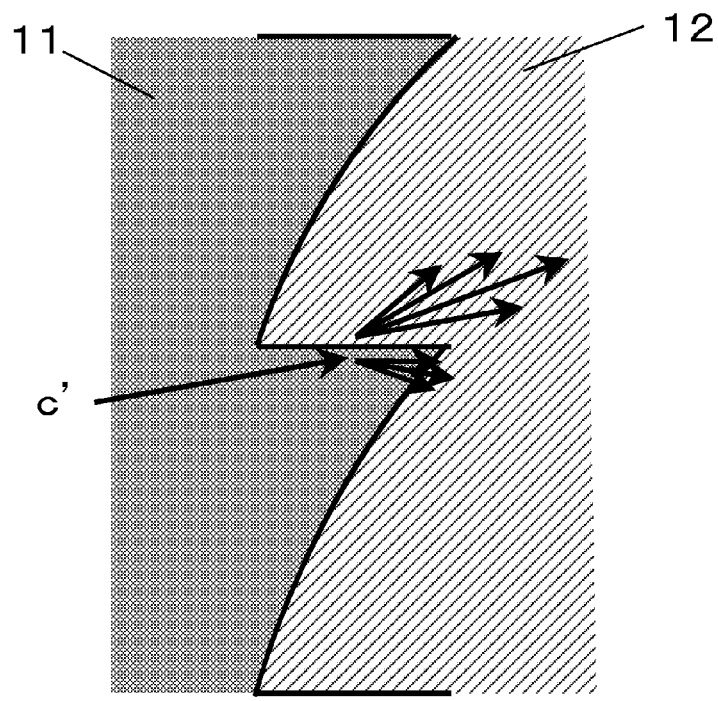
FIG. 22 is a schematic diagram illustrating a propagation of the unnecessary light for the light having the off-screen incident angle of −10 degrees of the diffractive optical element in the comparative example.

Next, considering light that enters the diffractive optical element at an oblique incident angle (an off-screen incident angle) of an upward direction with reference to the designed incident angle, FIGS. 21A and 21B illustrate the RCWA calculation result on conditions that the incident angle is −10 degrees, the grating pitch is 100 μm, and the wavelength is 550 nm. FIG. 21A is a diffraction efficiency near the +1st order diffracted light that is the designed order. The lateral axis indicates the diffractive order, and the vertical axis indicates the diffraction efficiency. FIG. 21B is a result of enlarging a part where the diffraction efficiency indicated by the vertical axis of FIG. 21A is small and of changing the lateral axis from the diffractive order to a diffractive angle to illustrate a high diffractive angle range. As illustrated in FIG. 21A, the diffraction efficiency of the +1st order diffracted light that is the designed order is concentrated, but the diffraction efficiency is 97.00% (the diffractive order of +1st order, and the diffractive angle of −9.42 degrees), which is decreased from 100% since the angle is inclined from 0 degree that is the designed incident angle. The remaining unnecessary light, as illustrated in FIG. 21B, propagates as unnecessary light that has a peak in a specific angle direction. This unnecessary light has a small peak in a direction of around −17 degrees in addition to a peak in a direction of around +10 degrees, and these propagation directions are substantially equal to a direction of −18.6 degrees that is an emission direction of transmitted light and to +9.5 degrees that is an emission direction of reflected light of the light having the incident angle of −10 degrees. Since it enters the grating wall surface from the side of the low refractive index material to the side of the high refractive index material at the angle of +80 degrees, the transmittance of the transmitted light is 91% and the reflectance of the reflected light is 9%, which correspond to a fact that the peak in the direction of around −15 degrees is large and that the peak in the direction of around +10 degrees is small. This unnecessary light is expanded from the peak to a large angle range, and as illustrated in FIG. 22, a component c' of the incident light entering the vicinity of the grating wall surface may be divided into the transmitted light and the reflected light on the grating wall surface to propagate, which further spread around each peak to propagate. At least the diffracted light of the unnecessary light by an off-screen light which is substantially equivalent to the diffractive angle of +0.20 degree at which the designed diffractive order for the designed incident angle propagates reaches the imaging plane when the diffractive optical element is applied to the optical system. As to the diffraction efficiency at the diffractive angle of around +0.20 degree in FIG. 21B, based on the RCWA calculation result, the diffraction efficiency of the diffractive order of +49 (the diffractive angle of +0.26 degree) is 0.0022%, and the diffraction efficiency of the diffractive order of +48 (the diffractive angle of +0.06 degree) is 0.0022%.

Figure 23:
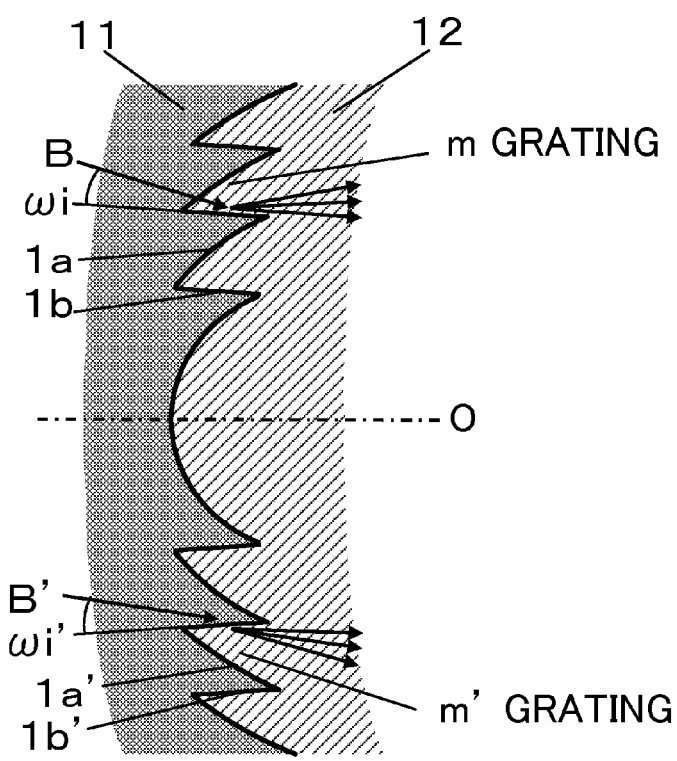
FIG. 23 is a schematic diagram illustrating a relationship between a structure of the diffractive optical element and off-screen incident light in the comparative example.

As described above, when the light having the off-screen incident angle of around 10 degrees enters the optical system to which the diffractive optical element of this comparative example is applied, as illustrated in FIGS. 2B and 23, an amount of the unnecessary light which is emitted by the m grating to the diffractive angle of around 0 degree is large, and on the other hand, an amount of the unnecessary light which is emitted by the m' grating to the diffractive angle of around 0 degree is small. Therefore, the m grating mainly contributes to the deterioration of the image performance. Actually, when the diffractive optical element and the optical system are configured to take an image, the unnecessary light reaches the imaging plane and the deterioration of the image performance is confirmed.

According to the conventional method, the light entering the grating wall surface is treated as a geometric optical phenomenon, but in this case the light entering the grating wall surface is emitted only in a specific direction to propagate in accordance with the Snell's law. As illustrated in FIGS. 2B and 23, when the diffractive optical element is applied to the optical system and the light having the off-screen incident angle of around 10 degrees enters, only the totally-reflected light is generated in the m grating, and the transmitted light of 91% and the reflected light of 9% are generated in the m' grating. However, any of the lights are blocked by the stop 40 and therefore they do not reach the imaging plane 41 in this case. As described above, the conventional method was inefficient for the reduction of the unnecessary light, and the unnecessary light to be reduced is not sufficiently considered.

Embodiment 5

Figure 16:
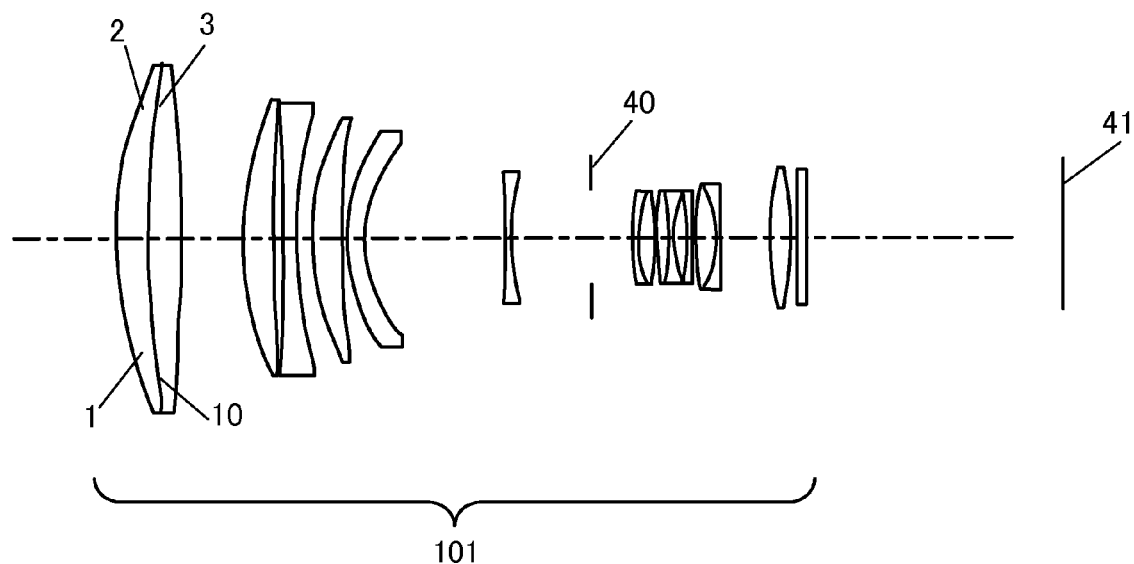
FIG. 16 is a schematic cross-sectional diagram of an image pickup optical system in Embodiment 5.

Next, Embodiment 5 of the present invention will be described. FIG. 16 is a schematic cross-sectional diagram of an image pickup optical system in the present embodiment. In FIG. 16, reference numeral 101 denotes an image pickup lens (an optical system), and includes the diffractive optical element 1 of each of the embodiments described above and a stop 40 that is disposed at a rear side of the diffractive optical element 1 inside it. Reference numeral 41 denotes an imaging plane on which a film or a photoelectric conversion element such as a CCD or a CMOS is disposed. In particular, the center of gravity of the distribution of the incident angle of the light entering the diffractive grating of the diffractive optical element 1 (same as the center of gravity of the diagram) is configured so as to be distributed nearer the center of the diffractive grating with reference to a surface normal at the center of the diffractive grating on the envelop plane. According to the present embodiment, a high-performance image pickup lens that generates a small amount of flare and that has high resolution can be obtained because the generation of the unnecessary light is significantly reduced even when the light enters the grating wall surface.

In FIG. 16, the diffractive optical element 1 is provided on a bonded surface of the front lens, but the embodiment is not limited to this, and alternatively it may be provided on a lens surface and a plurality of diffractive optical element may also be used in the image pickup lens 101. The present embodiment describes the case where the image pickup element 101 is used for the camera as an optical apparatus, but it is not limited to this. The embodiment is also applicable to a video camera, an image scanner of a business machine, an imaging optical system that is used for a wide wavelength range such as a reader lens of a digital copier, or the like that is another optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-133595, filed on Jun. 11, 2010, which is hereby incorporated by reference herein in its entirety.

What is claimed is:

1. A diffractive optical element configured to be usable as a lens of an optical system, the diffractive optical element comprising:
   a first diffractive grating that includes a first grating surface and a first grating wall surface;
   a reflective member disposed on the first grating wall surface; and
   a second diffractive grating that includes a second grating surface and a second grating wall surface, and that is disposed so that the second grating surface contacts the first grating surface and so that the second grating wall surface contacts the reflective member,
   wherein when off-screen light having an incident angle larger than an incident angle of off-axis light flux of the optical system enters the diffractive optical element at an incident angle $\omega i$ with reference to a surface normal of the lens, an emission angle $\omega o$ of light having a maximum intensity emitted from one of the first grating wall surface or the second grating wall surface meets the following Expression (1):

$$\omega o \geq \omega i \quad (1), \text{ and}$$

wherein a maximum width W (μm) of the reflective member and a grating pitch P (μm) of each of the first diffractive grating and the second diffractive grating meet the following Expressions (2-1) and (2-2):

$$0 < W/P < 0.04 \quad (2\text{-}1), \text{ and}$$

$$0.02 < W \quad (2\text{-}2).$$

2. The diffractive optical element according to claim 1, wherein the reflective member has a film shape of a uniform thickness.

3. The diffractive optical element according to claim 1, wherein the following expression is met:

$$\beta \leq \alpha < \gamma,$$

where α is an angle between the first grating surface and the surface normal, β is an angle between the first grating surface and the second grating wall surface, and γ is an angle between the first grating surface and the first grating wall surface.

4. The diffractive optical element according to claim 3, wherein the following condition is met:

$$\gamma - \beta > 0.5°.$$

5. The diffractive optical element according to claim 3, wherein a thickness of the reflective member increases from an incident side to an emission side.

6. The diffractive optical element according to claim 1, wherein the following condition is met:

$$0.8 < k,$$

where k is an extinction coefficient of a material constituting the reflective member in a visible wavelength range.

7. The diffractive optical element according to claim 1, wherein the reflective member is made of at least one of a metal and a material containing the metal.

8. An optical system comprising:
   a diffractive optical element configured to be usable as a lens of an optical system; and
   a stop disposed at a rear side of the diffractive optical element,
   wherein the diffractive optical element comprises:
   a first diffractive grating that includes a first grating surface and a first grating wall surface;
   a reflective member disposed on the first grating wall surface; and
   a second diffractive grating that includes a second grating surface and a second grating wall surface, and that is disposed so that the second grating surface contacts the first grating surface and so that the second grating wall surface contacts the reflective member,
   wherein when off-screen light having an incident angle larger than an incident angle of off-axis light flux of the optical system enters the diffractive optical element at an incident angle $\omega i$ with reference to a surface normal of the lens, an emission angle $\omega o$ of light having a maximum intensity emitted from one of the first grating wall surface or the second grating wall surface meets the following Expression (1):

$$\omega o \geq \omega i \quad (1), \text{ and}$$

wherein a maximum width W (μm) of the reflective member and a grating pitch P (μm) of each of the first diffractive grating and the second diffractive grating meet the following Expressions (2-1) and (2-2):

$$0 < W/P < 0.04 \quad (2\text{-}1), \text{ and}$$

$$0.02 < W \quad (2\text{-}2).$$

9. An optical apparatus comprising:
   a photoelectric conversion element; and
   an optical system comprising:
   a diffractive optical element configured to be usable as a lens of an optical system; and
   a stop disposed at a rear side of the diffractive optical element,
   wherein the diffractive optical element comprises:
   a first diffractive grating that includes a first grating surface and a first grating wall surface;
   a reflective member disposed on the first grating wall surface; and
   a second diffractive grating that includes a second grating surface and a second grating wall surface, and that is disposed so that the second grating surface contacts the first grating surface and so that the second grating wall surface contacts the reflective member,
   wherein when off-screen light having an incident angle larger than an incident angle of off-axis light flux of the optical system enters the diffractive optical element at an incident angle $\omega i$ with reference to a surface normal of the lens, an emission angle $\omega o$ of light having a maximum intensity emitted from one of the first grating wall surface or the second grating wall surface meets the following Expression (1):

$$\omega o \geq \omega i \quad (1), \text{ and}$$

wherein a maximum width W (μm) of the reflective member and a grating pitch P (μm) of each of the first diffractive grating and the second diffractive grating meet the following Expressions (2-1) and (2-2):

$$0 < W/P < 0.04 \quad (2\text{-}1), \text{ and}$$

$$0.02 < W \quad (2\text{-}2).$$

* * * * *